(12) United States Patent
Yoshida

(10) Patent No.: US 8,400,474 B2
(45) Date of Patent: Mar. 19, 2013

(54) IMAGING APPARATUS AND METHOD OF CONTROLLING IMAGING APPARATUS

(75) Inventor: Michiaki Yoshida, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 612 days.

(21) Appl. No.: 12/645,895

(22) Filed: Dec. 23, 2009

(65) Prior Publication Data

US 2010/0164993 A1 Jul. 1, 2010

(30) Foreign Application Priority Data

Dec. 27, 2008 (JP) ................................ 2008-335463

(51) Int. Cl.
*G09G 5/00* (2006.01)

(52) U.S. Cl. ........ 345/650; 345/619; 345/649; 345/684; 345/156; 345/158; 715/719; 715/764; 73/514.01; 725/37

(58) Field of Classification Search .................. 73/514.1; 715/764; 369/1; 725/38, 87
See application file for complete search history.

(56) References Cited

U.S. PATENT DOCUMENTS

| | | | |
|---|---|---|---|
| 6,346,891 B1 * | 2/2002 | Feinleib et al. | 340/12.3 |
| 2004/0046795 A1 * | 3/2004 | Josephson et al. | 715/764 |
| 2004/0199309 A1 * | 10/2004 | Hayashi et al. | 701/36 |
| 2005/0198677 A1 * | 9/2005 | Lewis | 725/87 |
| 2006/0233055 A1 * | 10/2006 | Hendrickson et al. | 369/1 |
| 2008/0060006 A1 * | 3/2008 | Shanks et al. | 725/38 |
| 2008/0134784 A1 * | 6/2008 | Jeng et al. | 73/514.01 |
| 2008/0158155 A1 * | 7/2008 | Liberty et al. | 345/158 |
| 2009/0054912 A1 * | 2/2009 | Heanue et al. | 606/142 |
| 2010/0023857 A1 * | 1/2010 | Mahesh et al. | 715/701 |
| 2010/0054744 A1 * | 3/2010 | Maxson | 398/106 |
| 2010/0083309 A1 * | 4/2010 | White et al. | 725/38 |
| 2010/0124949 A1 * | 5/2010 | Demuynck et al. | 455/569.1 |
| 2010/0201618 A1 * | 8/2010 | Lorente | 345/157 |

FOREIGN PATENT DOCUMENTS

| | | |
|---|---|---|
| EP | 0 625 744 A1 | 11/1994 |
| JP | 6-311564 A | 11/1994 |
| JP | 2003-5879 A | 1/2003 |
| JP | 2004-348616 A | 12/2004 |
| JP | 2006-287581 A | 10/2006 |
| JP | 4000570 B2 | 8/2007 |
| JP | 2008-42748 A | 2/2008 |
| JP | 2008-146619 A | 6/2008 |

* cited by examiner

*Primary Examiner* — Xiao M. Wu
*Assistant Examiner* — Phi Hoang
(74) *Attorney, Agent, or Firm* — Crowell & Moring LLP

(57) ABSTRACT

An imaging apparatus comprises a remote controller including no operating button and an imaging instrument including a display screen portion capable of displaying a first graphical user interface in association with movement of the remote controller. Selection item of the first graphical user interface is selected and determined on the basis of anteroposterior movement of the remote controller.

16 Claims, 18 Drawing Sheets

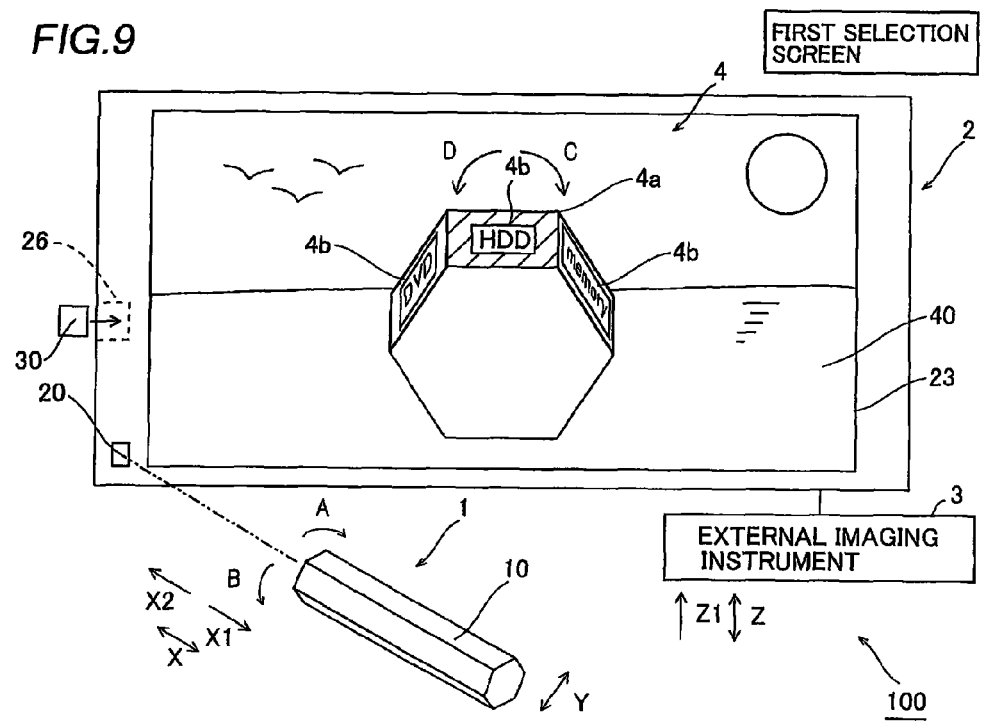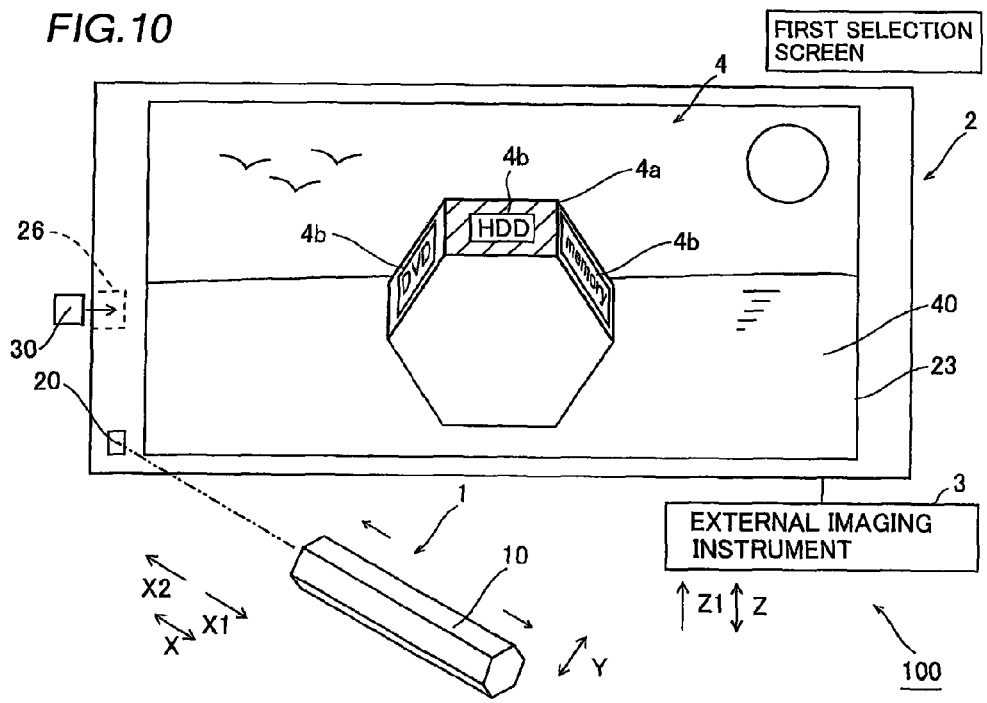

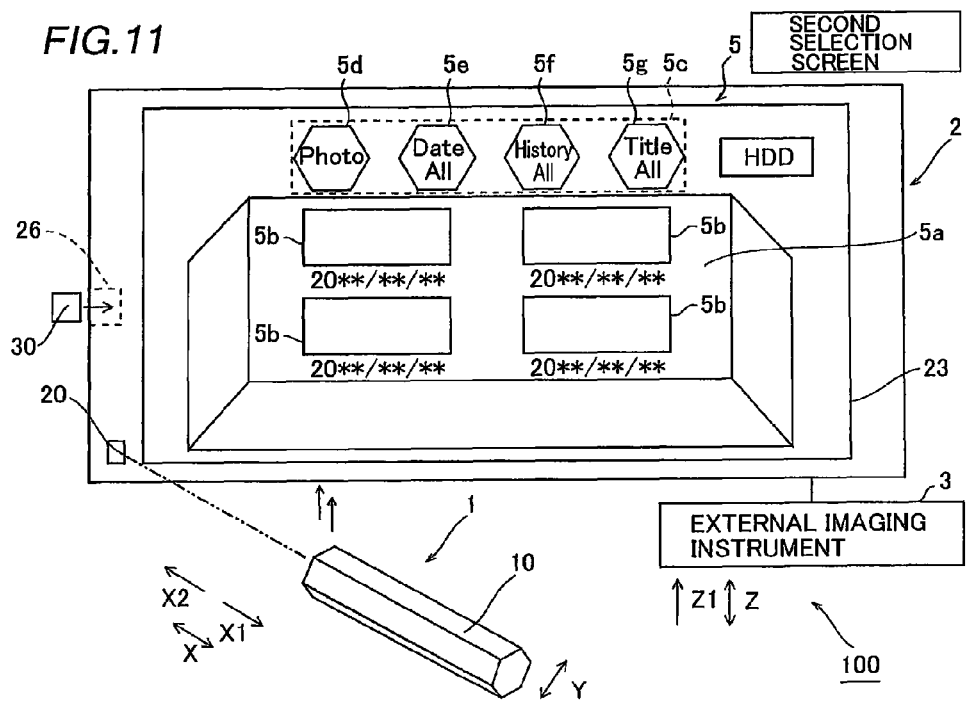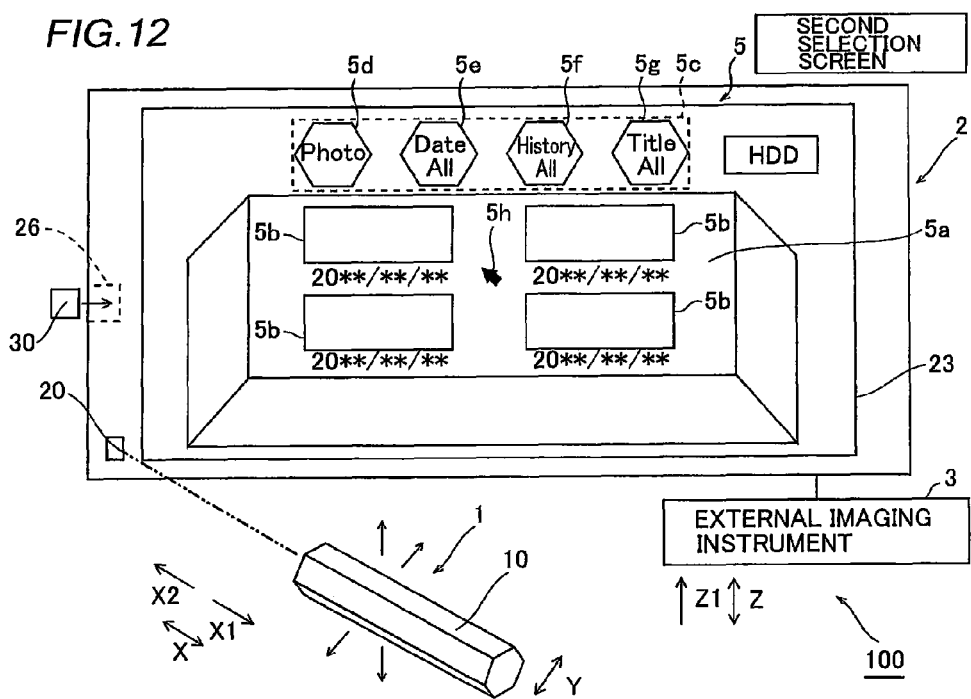

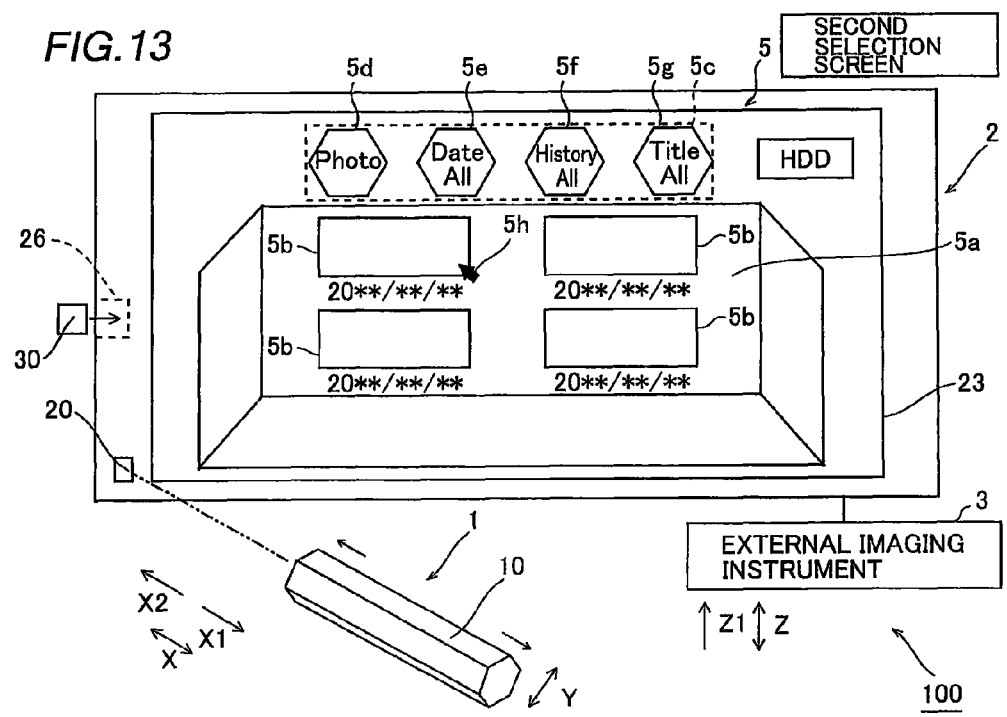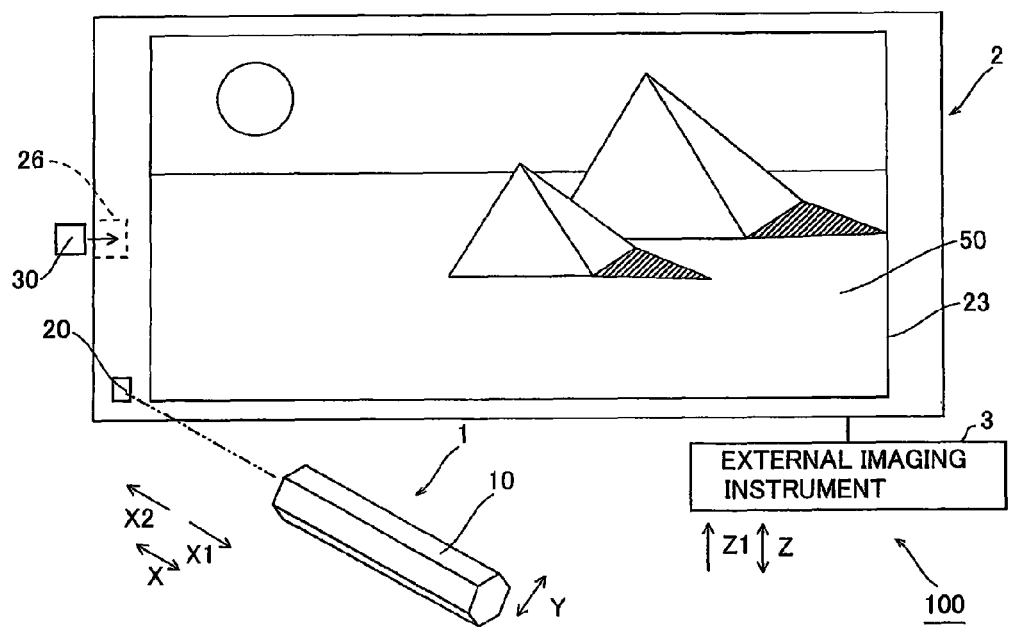

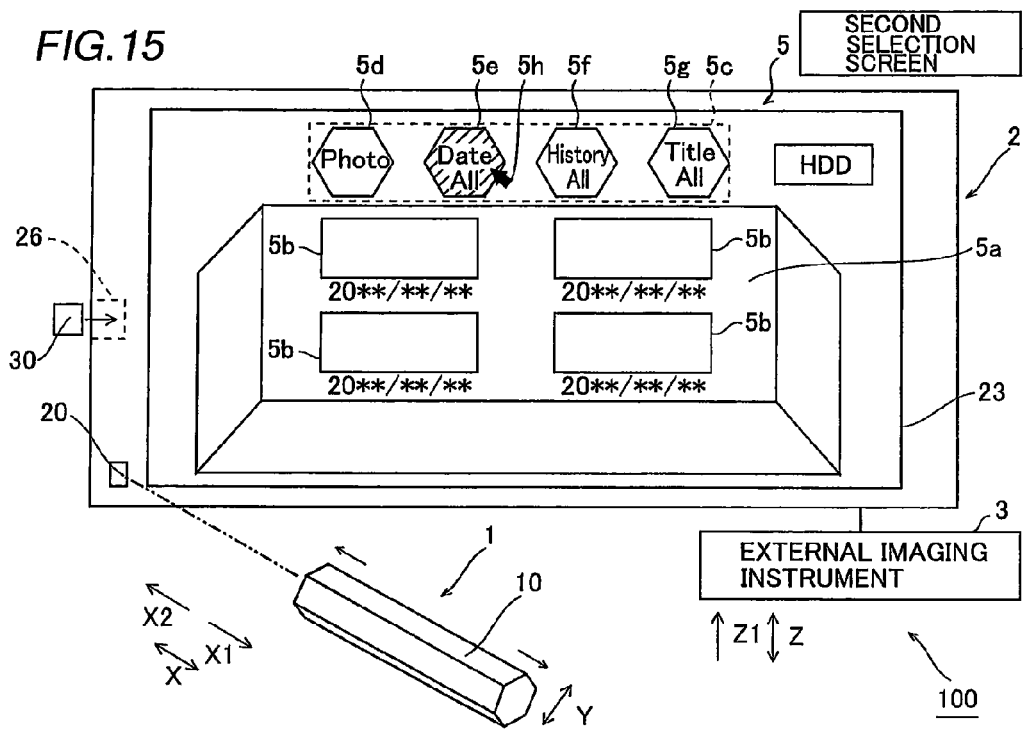
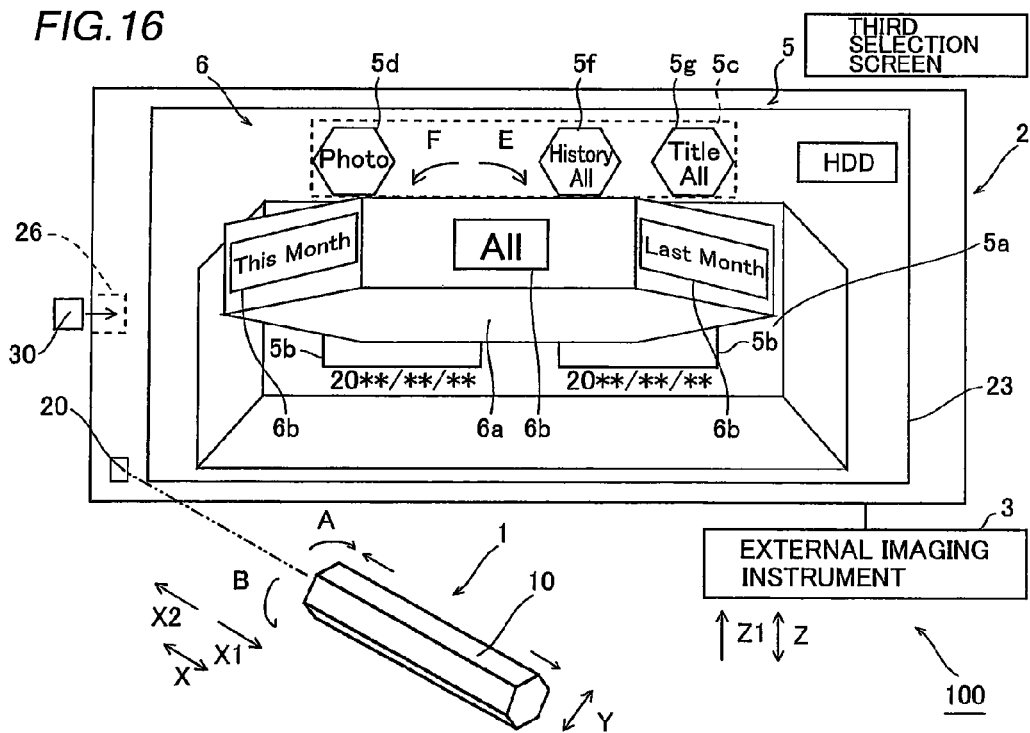

FIG. 18 CONTROL FLOW OF LIQUID CRYSTAL TELEVISION (1)

FIG. 19  CONTROL FLOW OF LIQUID CRYSTAL TELEVISION (2)

FIG.20  CONTROL FLOW OF LIQUID CRYSTAL TELEVISION (3)

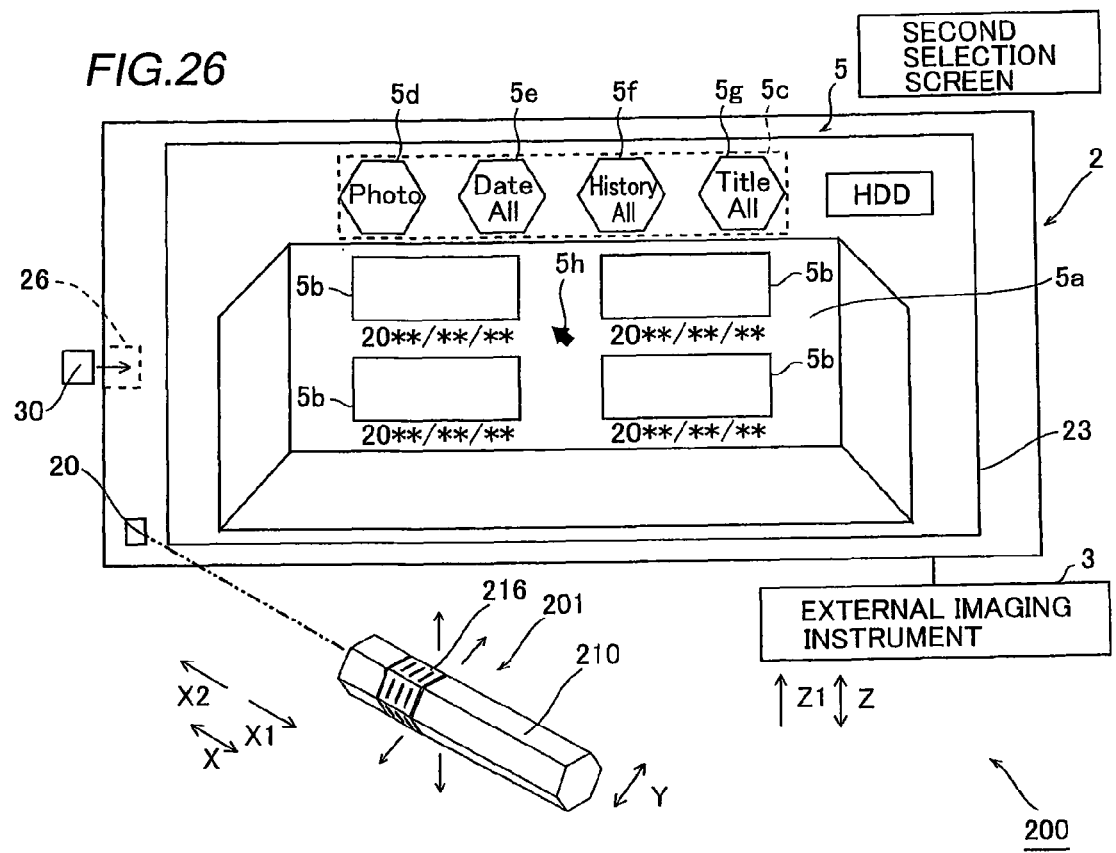

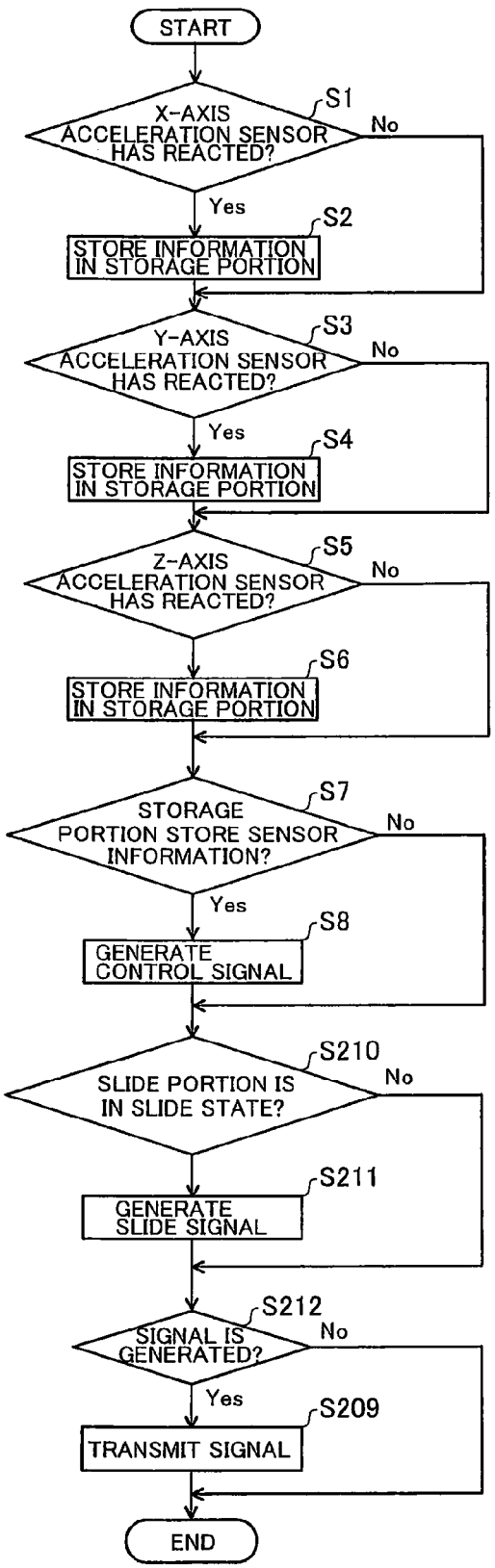
FIG.27 CONTROL FLOW OF REMOTE CONTROLLER

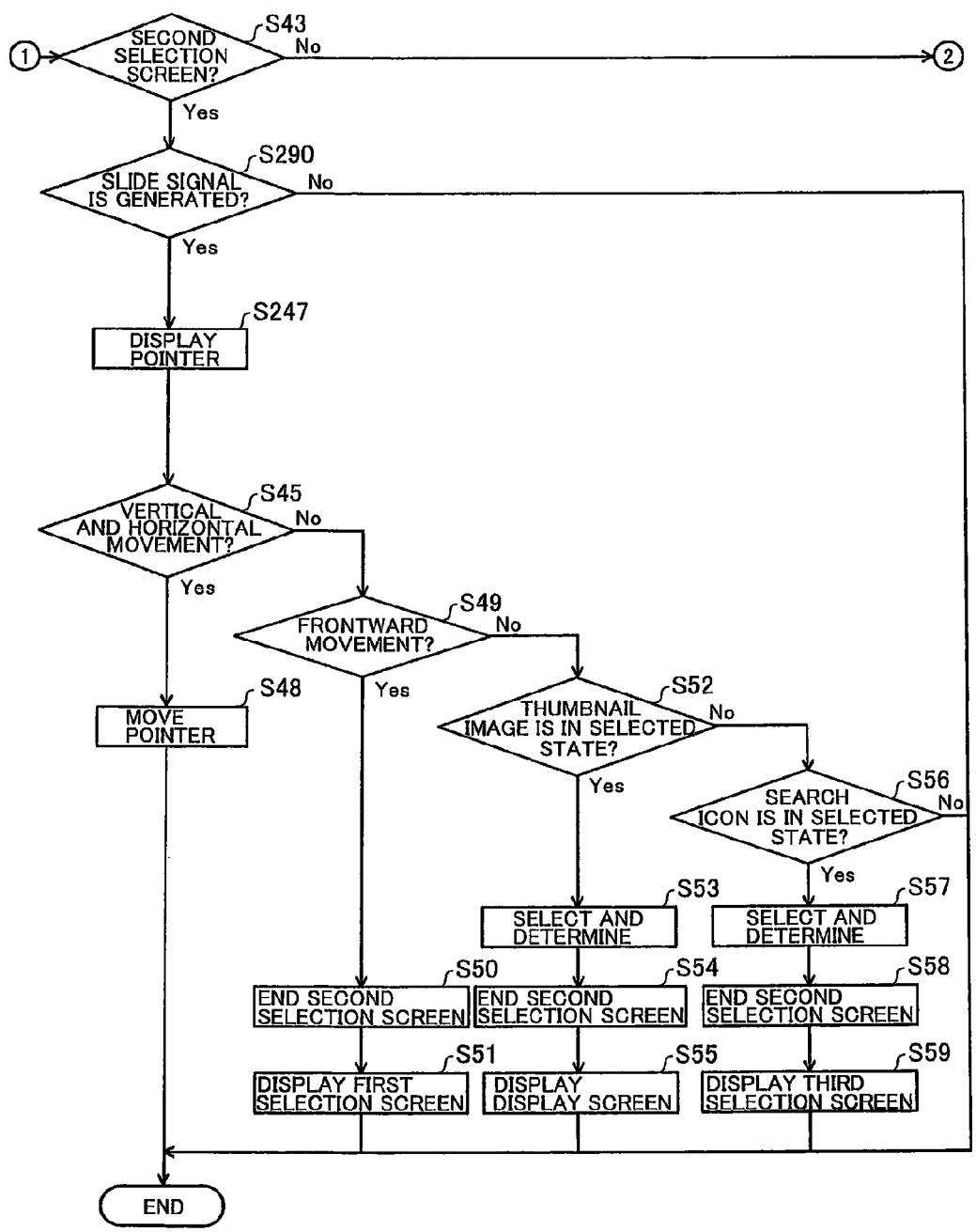
FIG.28 CONTROL FLOW OF LIQUID CRYSTAL TELEVISION (2)

IMAGING APPARATUS AND METHOD OF CONTROLLING IMAGING APPARATUS

BACKGROUND OF THE INVENTION

1. Field of the Invention

The present invention relates to an imaging apparatus and a method of controlling an imaging apparatus, and more particularly, it relates to an imaging apparatus comprising a remote controller including a motion detecting portion detecting movement and a method of controlling the imaging apparatus.

2. Description of the Background Art

An imaging apparatus comprises a remote controller including a motion detecting portion detecting movement is known in general, as disclosed in Japanese Patent Laying-Open Nos. 2008-42748, 2004-348616, 6-311564 and 2006-287581, for example.

The aforementioned Japanese Patent Laying-Open No. 2008-42748 discloses an audio and visual apparatus comprising a remote controller including a motion control sensor having an acceleration sensor detecting two-axial linear movement and a geomagnetic sensor detecting the quantity of rotation for three-axial direction, an operator having a button, a control portion determining operation from output of the motion control sensor and a signal transmission portion outputting a signal regarding the operation, and a television image receiving apparatus receiving the signal regarding the operation and performing processing corresponding to this signal. This audio and visual apparatus is so formed as to perform previously determined processing for the television image receiving apparatus when the motion control sensor detects any of anteroposterior linear movement, horizontal linear movement, rotation about a X-axis, rotation about a Y-axis and rotation about a Z-axis of the remote controller in a state where the button is pushed. This audio and visual apparatus is formed so as not to perform operation of the television image receiving apparatus in a state where the button is not pushed.

The aforementioned Japanese Patent Laying-Open No. 2004-348616 discloses an information processor comprising a remote controller including a X-axis angle detecting portion, a Y-axis angle detecting portion and a Z-axis angle detecting portion detecting rotational states when rotating about a X-axis, a Y-axis and a Z-axis, respectively and a selection portion having an input button, an image recorder including a character control portion and a television image receiver displaying a screen (graphical user interface) on which characters are circularly arranged. This information processor is so formed that the selected character is switched in the same direction as a rotational direction of the remote controller in response to a rotational state of the remote controller transmitted from the remote controller and the selected character is selected and determined in response to selection information by pushing the input button.

The aforementioned Japanese Patent Laying-Open No. 6-311564 discloses a remote control system employing a transmitter (remote controller) including an angular speed sensor detecting an angular speed, a switch such as an execution switch and a transmission portion transmitting a control signal, and a television displaying a cursor and selection items (graphical user interface) arranged in the form of a ring. In this remote control system, the cursor showing selection moves in the same direction of a rotational direction of the transmitter (remote controller) on the selection items arranged in the form of the ring in response to the rotational direction of the transmitter, and the selection item on which the cursor is located is selected and determined by pushing the execution switch.

The aforementioned Japanese Patent Laying-Open No. 2006-287581 discloses a remote control system employing a remote controller including a sensor detecting movement, a menu button, a control portion and a light-emitting portion emitting light in accordance with a control signal, and a photoreceptive portion receiving light from the light-emitting portion, a control portion, an overlay graphics processing portion and a display portion displaying an operator interface screen having icons and a pointer. In this remote control system, the operator interface screen and the pointer are displayed to overlap with a television image displayed on the display portion by the overlay graphics processing portion by pushing the menu button, and the pointer moves in the same direction as movement of the remote controller in response to the movement of the remote controller transmitted from the light-emitting portion. Then, the menu button is pushed again, so that the icon on which the pointer is located is selected and determined and execution of various functions corresponding to the selected icon is instructed.

Further, an apparatus comprising a motion detecting portion detecting movement on the apparatus body including a display screen portion is known in general. For example, Japanese Patent No. 4000570 discloses an information processor (PDA) comprising a three-axis gyro sensor detecting three-axial movement, a housing provided with an operating button, a control portion, a LCD displaying a cursor and a menu (graphical user interface). This information processor is so formed that a drum-shaped menu displayed on the LCD rotates in association with rotation of the information processor (apparatus body) when the rotation of the information processor is detected by the three-axis gyro sensor in a state where the operating button is pushed down, and the drum-shaped menu is stopped rotating when pushing-down of the operating button is cancelled and the menu item displayed in the cursor is selected and determined. This information processor is so formed that rotation of the information processor is not detected by the three-axis gyro sensor in a state where the operating button is not pushed down.

In the audio and visual apparatus described in aforementioned Japanese Patent Laying-Open No. 2008-42748, however, the remote controller must be rotated in the state where the button is pushed down in order to perform the processing for the television image receiving apparatus. At this time, it is disadvantageously difficult for an operator to largely rotate the remote controller in the state where the button is pushed down. Thus, operability of the remote controller is conceivably disadvantageously deteriorated.

In the information processor (remote control system) described in each of the aforementioned Japanese Patent Laying-Open Nos. 2004-348616 and 6-311564, it may be conceivably disadvantageously difficult to push down the input button (execution switch) depending on the rotational state of the remote controller (transmitter) when the selection and determination are made. Thus, operability of the information processor (remote control system) is conceivably disadvantageously deteriorated.

In the remote control system described in the aforementioned Japanese Patent Laying-Open No. 2006-287581, there is conceivably a high possibility that the button is wrongly pushed down in a case where a plurality of buttons are provided, since the menu button must be pushed down a plurality of times when selection and determination are made. Thus, operability of the remote control system is conceivably disadvantageously deteriorated.

The information processor described in aforementioned Japanese Patent No. 4000570 is an apparatus for simultaneously operating the menu of the display screen by detecting the movement of the information processor body apparatus such as PDA having the display screen (LCD) and is completely different from the present invention comprising a remote controller including a motion detecting portion and an imaging instrument remote-controlled by a remote controller in the supposed technology.

SUMMARY OF THE INVENTION

The present invention has been proposed in order to solve the aforementioned problems, and an object of the present invention is to provide an imaging apparatus capable of improving operability of a remote controller.

An imaging apparatus according to a first aspect of the present invention comprises a remote controller including a motion detecting portion detecting movement of a remote controller body and an actuating signal transmission portion transmitting an actuating signal corresponding to the movement on the basis of a result of detection of the motion detecting portion and not including an operating button and an imaging instrument including an actuating signal receiving portion receiving the actuating signal transmitted from the actuating signal transmission portion and a display screen portion capable of displaying a first graphical user interface successively selectably displaying a plurality of selection items in association of movement, other than anteroposterior movement, of the remote controller on the basis of the actuating signal, wherein the selection item of the first graphical user interface is selected and determined on the basis of the actuating signal corresponding to the anteroposterior movement of the remote controller.

In this imaging apparatus according to the first aspect, as hereinabove described, the remote controller including no operating button is employed and the first graphical user interface on the display screen portion of the imaging instrument is moved in association with the movement, other than the anteroposterior movement, of the remote controller, whereby the first graphical user interface can be moved only by moving the remote controller without pushing down the operating button. Thus, operability of the remote controller can be improved. Further, the remote controller can be anteroposteriorly moved, whereby the selection item of the first graphical user interface can be selected and determined, and hence the first graphical user interface can be selected and determined without providing the operating button. This also can improve operability of the remote controller. The "graphical user interface" in the present invention is not restricted to an icon but includes a menu and the like. The "anteroposterior direction" means a direction on a line connecting the remote controller and the imaging instrument.

In the aforementioned imaging apparatus according to the first aspect, the imaging instrument preferably further includes a control portion controlling the actuating signal receiving portion and the display screen portion, and the control portion preferably controls so as to successively selectably display the plurality of selection items while the first graphical user interface rotates in the same direction as a rotational direction of the remote controller in association with rotational motion of the remote controller, and preferably controls so as to select and determine any of the plurality of selection items on the basis of the anteroposterior movement of the remote controller. According to this structure, the selection item of the first graphical user interface can be easily selected and determined by the rotational movement and the anteroposterior movement of the remote controller by the operator.

In this case, the control portion is preferably formed so as to display the first graphical user interface on the display screen portion to continuously rotate the first graphical user interface when the remote controller performs rotational motion at a constant angular speed or more, and so as to display the first graphical user interface on the display screen portion to stop rotation of the first graphical user interface when the remote controller is rotated in a direction opposite to a rotational direction of the first graphical user interface in a state where the first graphical user interface is displayed to continuously rotate. According to this structure, the operator can keep rotating the first graphical user interface displayed on the display screen portion without rotating the remote controller many times, and the rotation of the first graphical user interface can be easily stopped by the rotational movement in the opposite direction, and hence operability of the remote controller can be improved also in this point.

In the aforementioned imaging apparatus in which the imaging instrument further includes the control portion, the control portion is preferably formed so as to display the first graphical user interface constituted by a rotating body having a plurality of display surfaces on the display screen portion, so as to display one of the plurality of selection items on each of the plurality of display surfaces, and so as to be capable of selecting the selection item displayed on the display surface located on a front side among the plurality of display surfaces. According to this structure, the operator can further reliably operate the movement of the first graphical user interface constituted by the rotating body displayed on the display screen portion in association with the rotational movement of the remote controller and, and hence operability of the remote controller can be further improved. The selection item displayed on the display surface located on the front side is brought into a selectable state among the plurality of display surfaces, whereby the selectable selection item can be apparently displayed on the display screen portion.

In the aforementioned imaging apparatus in which the imaging instrument further includes the control portion, the control portion is preferably formed so as to display the first graphical user interface having a shape corresponding to a shape of the remote controller on the display screen portion. According to this structure, the operator can viscerally move the first graphical user interface having the shape corresponding to the shape of the remote controller displayed on the display screen portion by moving the remote controller, and hence operability of the remote controller can be further improved.

In this case, the remote controller preferably has a polygonal prism shape, and the control portion is preferably formed so as to display the first graphical user interface having the polygonal prism shape corresponding to the shape of the remote controller on the display screen portion, and so as to display one of the plurality of selection items on each of the plurality of display surfaces of the polygonal prism shape of the first graphical user interface. According to this structure, the operator can viscerally move the first graphical user interface having the polygonal prism shape corresponding to the shape of the remote controller displayed on the display screen portion by moving the remote controller having the polygonal prism shape and the first graphical user interface can be sterically displayed, and hence the operator can more viscerally operate it. One of the plurality of the selection items is displayed on each of the plurality of display surfaces of the polygonal prism shape of the first graphical user interface, whereby the operator can further viscerally select and determine the plurality of the selection items.

In the aforementioned imaging apparatus so formed that the control portion can select the selection item displayed on the display surface located on the front side, the control portion is preferably so formed that the selection item adjacent to the selection item which was located on the front side is located on the front side and can be selected in the place of the selection item which was located on the front side when the remote controller performs rotational motion at an angular speed smaller than a constant angular speed. According to this structure, any of the prescribed selection items is always located on the front side to be brought into selectable state dissimilarly to a case where the first graphical user interface is rotated in response to the rotational angle of the remote controller, and hence the operator can more easily select and determine one of the plurality of the selection items.

In the aforementioned imaging apparatus in which the imaging instrument further includes the control portion, the control portion is preferably formed so as to select and determine the selection item of the first graphical user interface on the basis of a first directional movement of the anteroposterior direction of the remote controller, and so as to cancel display of the first graphical user interface on the basis of a second directional movement of the anteroposterior direction of the remote controller. According to this structure, the operator can perform the selection and determination of the selection items and cancellation of the display of the first graphical user interface by moving the remote controller frontward and backward.

In the aforementioned imaging apparatus in which the imaging instrument further includes the control portion, the control portion is preferably formed so as to display the first graphical user interface on the display screen portion on the basis of the anteroposterior movement of the remote controller in a state where the first graphical user interface is not displayed on the display screen portion. According to this structure, the first graphical user interface can be displayed on the display screen portion without providing the operating button, and hence this also can improve operability of the remote controller.

In the aforementioned imaging apparatus in which the imaging instrument further includes the control portion, the display screen portion is preferably enabled to display a first selection screen on which the first graphical user interface is displayed and a second selection screen selectably displaying a plurality of second graphical user interfaces corresponding to the selection item, selected and determined on the first selection screen, of the first graphical user interface, and the control portion is preferably formed so as to select and determine a prescribed second graphical user interface selected by a pointer on the basis of the anteroposterior movement of the remote controller on the second selection screen after selecting and determining a prescribed selection item of the first graphical user interface on the basis of the anteroposterior movement of the remote controller on the first selection screen. According to this structure, the selection item of the first graphical user interface and the second graphical user interface can be selected and determined on both of the first selection screen and the second selection screen for specifically selecting the selection item selected by the first selection screen by the anteroposterior movement of the remote controller, and hence operability of the remote controller can be further improved.

In this case, the display screen portion is preferably enabled to display the second selection screen selectably displaying the plurality of second graphical user interfaces and a third selection screen including a third graphical user interface corresponding to the selected and determined second graphical user interface and successively selectably displaying a plurality of detailed selection items in association with the movement, other than the anteroposterior movement, of the remote controller, and the control portion is preferably formed so as to select and determine detailed selection item of the third graphical user interface on the basis of the anteroposterior movement of the remote controller on the third selection screen after selecting and determining the prescribed second graphical user interface selected by the pointer on the basis of the anteroposterior movement of the remote controller on the second selection screen. According to this structure, the second graphical user interface and the detailed selection item of the third graphical user interface can be selected and determined on both of the second selection screen and the third selection screen for specifically selecting the contents regarding the second graphical user interface selected by the second selection screen by the anteroposterior movement of the remote controller, and hence operability of the remote controller can be further improved.

In the aforementioned imaging apparatus in which the imaging instrument further includes the control portion, the control portion is preferably formed so as to display a pointer on the display screen portion on the basis of continuous movement of the remote controller in either one of upward and downward directions a plurality of times. According to this structure, the operator moves the remote controller either one of the upward and downward directions a plurality of times, whereby the pointer is displayed on the display screen portion, and hence no operating button for displaying the pointer may be provided.

In the aforementioned imaging apparatus according to the first aspect, the remote controller preferably further includes a slide portion for displaying a pointer on the display screen portion by sliding. According to this structure, the pointer can be displayed on the display screen portion by sliding the slide portion by the operator, no operating button for displaying the pointer may be provided.

In the aforementioned imaging apparatus according to the first aspect, the imaging instrument is preferably a television receiving television broadcasting and including a storage portion capable of recording the received television broadcasting. According to this structure, in the imaging apparatus comprising the television, the remote controller including no operating button is employed and the first graphical user interface on the display screen portion of the imaging instrument is moved in association with the movement of the remote controller, whereby the first graphical user interface can be moved only by moving the remote controller without pushing down the operating button. Thus, operability of the remote controller of the television can be improved. Further, the remote controller of the television is be anteroposteriorly moved, whereby the selection item of the first graphical user interface can be selected and determined, and hence the first graphical user interface can be selected and determined without providing the operating button. This also can improve operability of the remote controller of the television. The storage portion is provided on the television, whereby received television broadcasting can be recorded without connecting an external recorder.

A method of controlling an imaging apparatus according to a second aspect of the present invention comprises steps of displaying a first graphical user interface successively selectably displaying a plurality of selection items in association with movement, other than anteroposterior movement, of a remote controller including no operating button on a display screen portion of an imaging instrument, and selecting and determining selection item of the first graphical user interface displayed on the display screen portion on the basis of the anteroposterior movement of the remote controller.

As hereinabove described, this method of controlling the imaging apparatus according to the second aspect comprises the step of displaying the first graphical user interface successively selectably displaying the plurality of selection items in association with the movement, other than the anteroposterior movement, of the remote controller including no operating button on the display screen portion of the imaging instrument, whereby the first graphical user interface can be moved only by moving the remote controller without pushing down the operating button. Thus, operability of the remote controller can be improved. Further, the method of controlling the imaging apparatus comprises the step of selecting and determining the selection item of the first graphical user interface displayed on the display screen portion on the basis of the anteroposterior movement of the remote controller, whereby the selection item of the first graphical user interface can be selected and determined, and hence the first graphical user interface can be selected and determined without providing the operating button. This also can improve operability of the remote controller.

In aforementioned method of controlling the imaging apparatus according to the second aspect, the step of displaying the first graphical user interface on the display screen portion preferably includes a step of successively selectably displaying the plurality of selection items of the first graphical user interface while rotating the first graphical user interface in the same direction as a rotational direction of the remote controller in association with rotational motion of the remote controller, and the step of selecting and determining the selection item of the first graphical user interface preferably includes a step of selecting and determining any of the plurality of selection items on the basis of the anteroposterior movement of the remote controller. According to this structure, the selection item of the first graphical user interface can be easily selected and determined by the rotational movement and the anteroposterior movement of the remote controller by the operator.

In this case, the step of successively selectably displaying the plurality of selection items preferably includes steps of displaying the first graphical user interface on the display screen portion to continuously rotate the first graphical user interface when the remote controller performs rotational motion at a constant angular speed or more, and displaying the first graphical user interface on the display screen portion to stop rotation of the first graphical user interface when the remote controller rotates in a direction opposite to a rotational direction of the first graphical user interface. According to this structure, the operator can keep rotating the first graphical user interface displayed on the display screen portion without rotating the remote controller many times, and the rotation of the first graphical user interface can be easily stopped by the rotational movement in the opposite direction, and hence operability of the remote controller can be improved also in this point.

In aforementioned method of controlling the imaging apparatus according to the second aspect, the step of displaying the first graphical user interface on the display screen portion preferably includes steps of displaying the first graphical user interface constituted by a rotating body having a plurality of display surfaces, each of which having one of the plurality of selection items displayed thereon, on the display screen portion, and allowing selection of the selection item displayed on the display surface located on a front side among the plurality of display surfaces. According to this structure, the operator can further reliably operate the movement of the first graphical user interface constituted by the rotating body displayed on the display screen portion in association with the rotational movement of the remote controller and, and hence operability of the remote controller can be improved. The step of bringing the selection item displayed on the display surface located on the front side among the plurality of display surfaces in the selectable state is included, whereby the selectable selection item can be apparently displayed on the display screen portion.

In aforementioned method of controlling the imaging apparatus according to the second aspect, the step of displaying the first graphical user interface on the display screen portion preferably includes a step of displaying the first graphical user interface having a shape corresponding to a shape of the remote controller on the display screen portion. According to this structure, the operator can viscerally move the first graphical user interface having the shape corresponding to the shape of the remote controller displayed on the display screen portion by moving the remote controller, and hence operability of the remote controller can be improved.

The aforementioned method of controlling the imaging apparatus according to the second aspect preferably further comprises steps of displaying a plurality of second graphical user interfaces corresponding to the selected and determined selection item of the first graphical user interface after the step of selecting and determining the selection item of the first graphical user interface, and selecting and determining a prescribed second graphical user interface selected by a pointer on the basis of the anteroposterior movement of the remote controller. According to this structure, the selection item of the first graphical user interface and the second graphical user interface can be selected and determined on both of the first selection screen and the second selection screen for specifically selecting the selection item selected by the first selection screen by the anteroposterior movement of the remote controller, and hence operability of the remote controller can be further improved.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 7 to 16 are diagrams for illustrating a display image selecting operation of the imaging apparatus according to the first embodiment of the present invention;

FIGS. 25 and 26 are diagrams for illustrating a display image selecting operation of the imaging apparatus according to the second embodiment of the present invention;

FIG. 27 is a diagram for illustrating a control flow of the remote controller of the imaging apparatus according to the second embodiment of the present invention; and FIG. 28 is a diagram for illustrating a control flow of a liquid crystal television of the imaging apparatus according to the second embodiment of the present invention.

DESCRIPTION OF THE PREFERRED EMBODIMENTS

Embodiments of the present invention will be hereinafter described with reference to the drawings.

First Embodiment

A structure of an imaging apparatus 100 according to a first embodiment of the present invention will be now described with reference to FIGS. 1 to 6.

Figure 1:
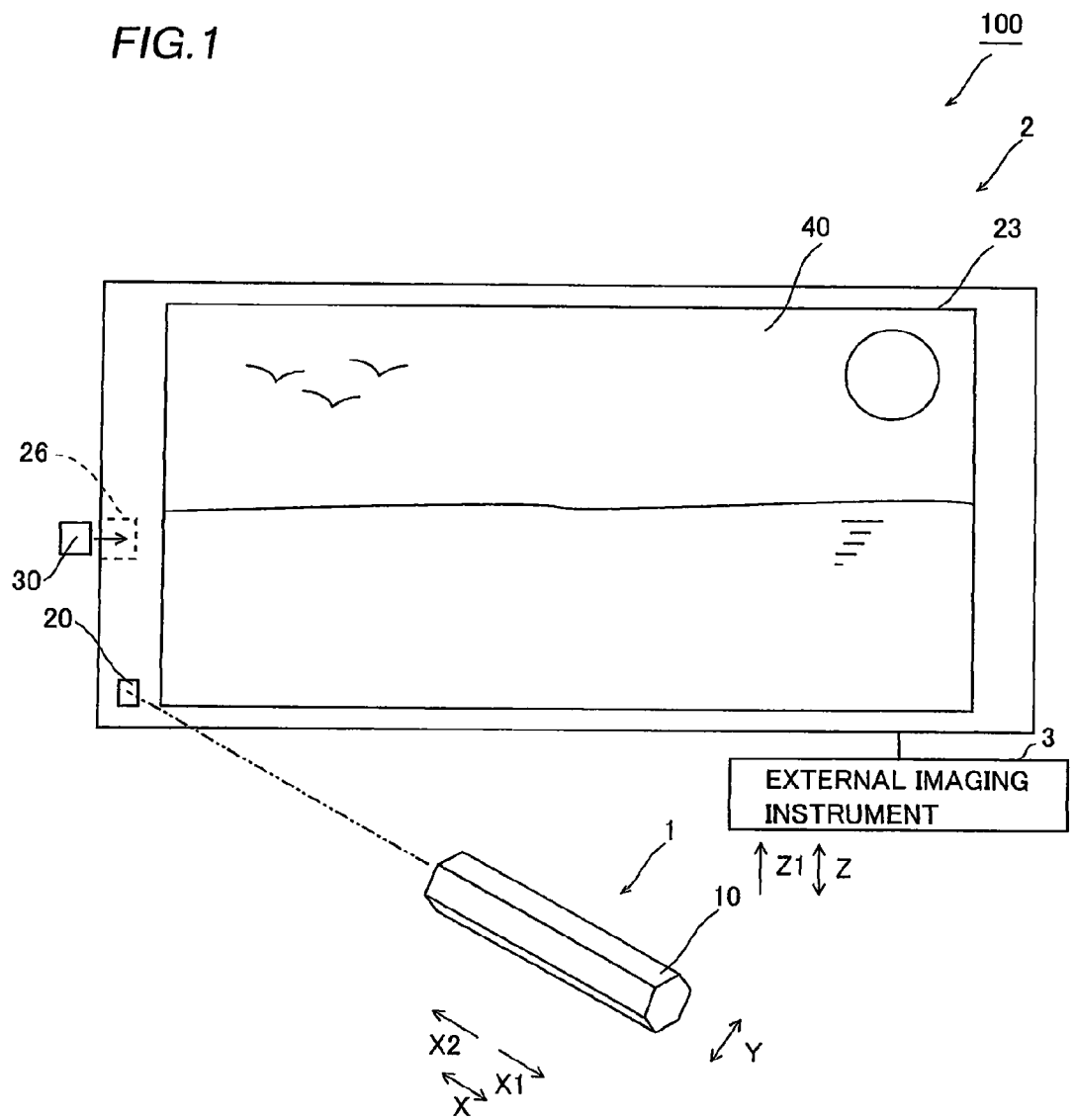
FIG. 1 is a diagram showing an overall structure of an imaging apparatus according to a first embodiment of the present invention.
Figure 2:
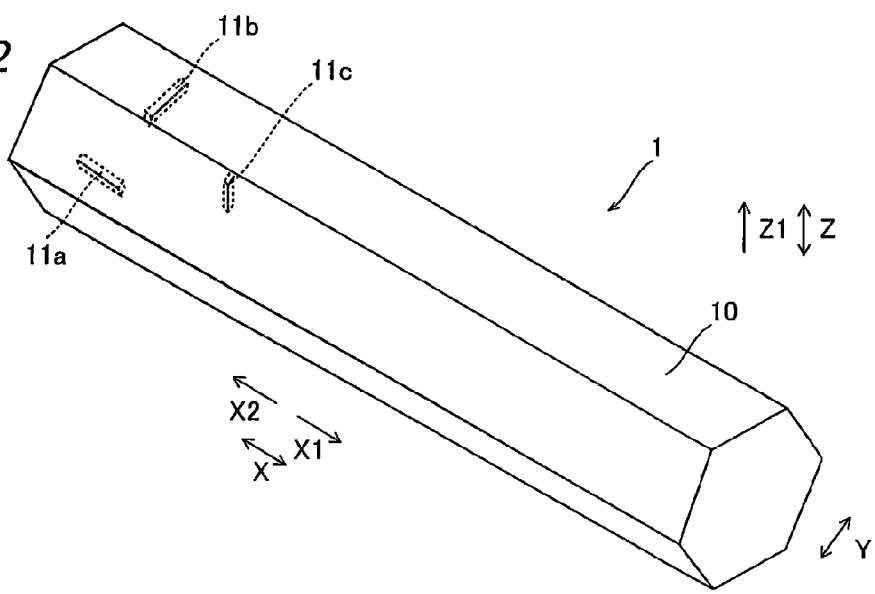
FIG. 2 is a perspective view showing a structure of a remote controller of the imaging apparatus shown in FIG. 1.
Figure 3:
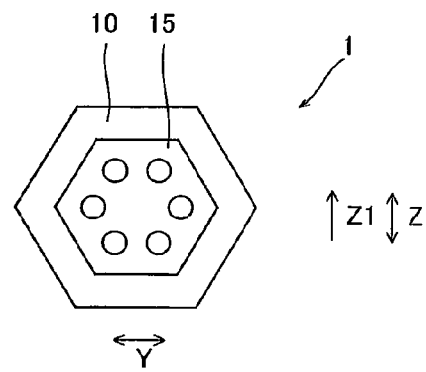
FIG. 3 is a front elevational view showing the structure of the remote controller of the imaging apparatus shown in FIG. 1.
Figure 4:
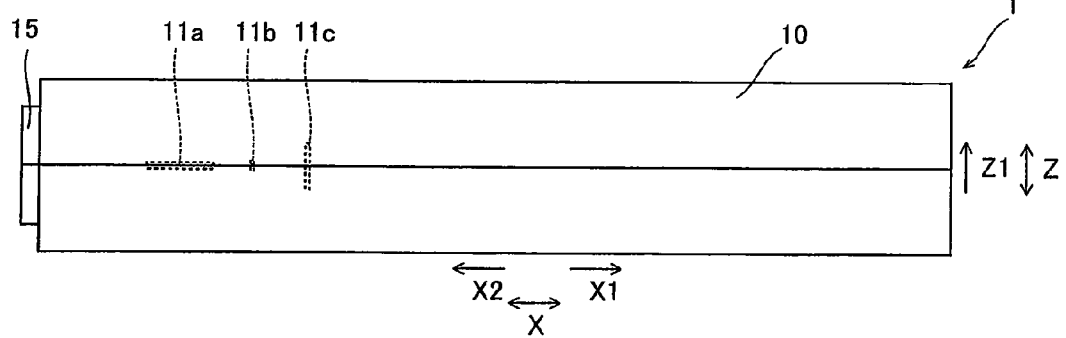
FIG. 4 is a side elevational view showing a structure of the remote controller of the imaging apparatus shown in FIG. 1.

The imaging apparatus 100 according to the first embodiment of the present invention comprises a remote controller 1, a liquid crystal television 2 and an external imaging instrument 3, as shown in FIG. 1. The liquid crystal television 2 is an example of the "imaging instrument" or the "television" in the present invention. The remote controller 1 is constituted by a housing 10 having a hexagonal prism shape extending in a direction X, as shown in FIGS. 2 to 4.

Figure 5:
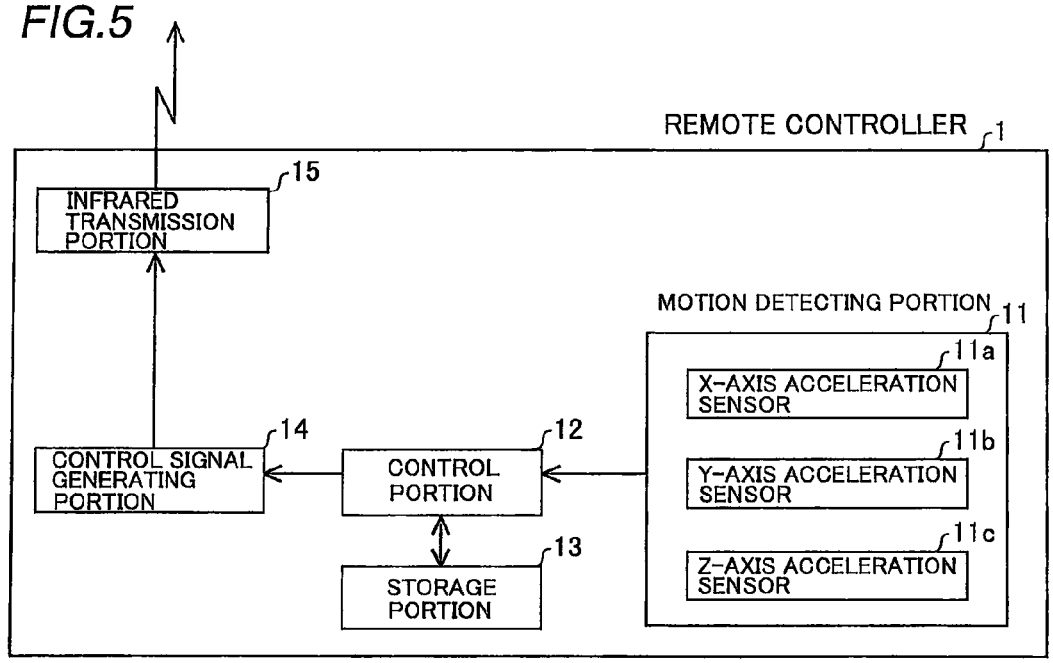
FIG. 5 is a block diagram showing an internal structure of the remote controller of the imaging apparatus shown in FIG. 1.

The remote controller 1 includes a motion detecting portion 11, a control portion 12, a storage portion 13, a control signal generating portion 14 and an infrared transmission portion 15, as shown in FIG. 5. As shown in FIGS. 1 to 4, no operating button is provided on the remote controller 1 of the first embodiment. The infrared transmission portion 15 is an example of the "actuating signal transmission portion" in the present invention.

The motion detecting portion 11 is constituted by a X-axis acceleration sensor 11a, a Y-axis acceleration sensor 11b and a Z-axis acceleration sensor 11c. These X-, Y- and Z-axes acceleration sensors 11a, 11b and 11c are stored in the housing 10 as shown in FIGS. 2 and 4. The X-, Y- and Z-axes acceleration sensors 11a, 11b and 11c have functions of detecting X-, Y- and Z-directional movement (acceleration) of the remote controller 1 and outputting the detected X-, Y- and Z-directional acceleration to the control portion 12, as shown in FIG. 5.

The control portion 12 is so formed that the storage portion 13 temporarily stores the X-, Y- and Z-directional acceleration of the remote controller 1 output from the X-, Y- and Z-axes acceleration sensors 11a, 11b and 11c, respectively.

The control signal generating portion 14 has a function of generating a control signal corresponding to movement detected from the X-, Y- and Z-directional acceleration of the remote controller 1 outputted from the control portion 12 and outputting the same to the infrared transmission portion 15. The control signal is an example of the "actuating signal" in the present invention. The infrared transmission portion 15 has a function of transmitting the control signal outputted from the control signal generating portion 14 outward by the infrared communication.

Figure 6:
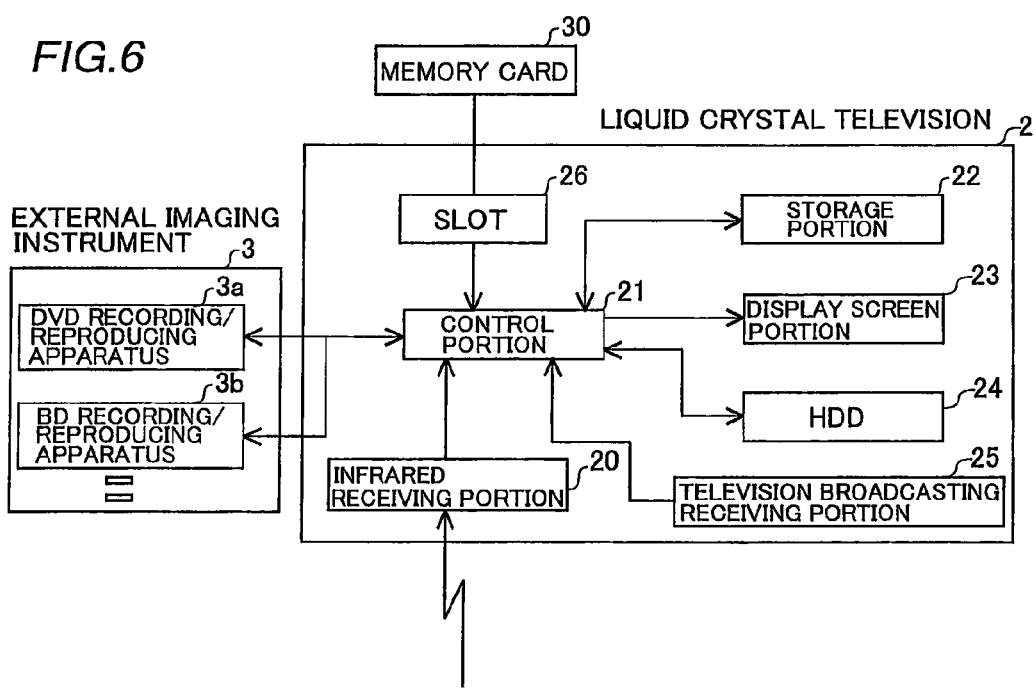
FIG. 6 is a block diagram showing an internal structure of a liquid crystal television of the imaging apparatus shown in FIG. 1.

The liquid crystal television 2 includes an infrared receiving portion 20, a control portion 21, a storage portion 22, a display screen portion 23, a HDD (hard disk drive) 24, a television broadcasting receiving portion 25 for receiving television broadcasting and a slot 26 capable of receiving a memory card 30, as shown in FIG. 6. The infrared receiving portion 20 has a function of receiving the control signal transmitted from the infrared transmission portion 15 and outputting the control signal to the control portion 21. The infrared receiving portion 20 is an example of the "actuating signal receiving portion" in the present invention, and the HDD 24 is an example of the "storage portion" in the present invention.

The control portion 21 has a function of processing the control signal output from the infrared receiving portion 20 and outputting the operation contents of menu icons 4a and 6a, thumbnail images 5b, search icons 5d to 5g and a pointer 5h, described later, corresponding to the control signal to the display screen portion 23. The storage portion 22 previously stores processing information related to the control signal and the control portion 21 reads the processing information related to the control signal. The display screen portion 23 is substantially flat, displays a display image 40 (see FIG. 1), and displays the menu icons 4a and 6a, the thumbnail images 5b, the search icons 5d to 5g and the pointer 5h. The HDD 24 and the memory card 30 each store a plurality of display images and are capable of displaying the stored display images on the display screen portion 23 through the control portion 21.

The external imaging instrument 3 includes a DVD (digital versatile disk) recording/reproducing apparatus 3a and a BD (blu-ray disc) recording/reproducing apparatus 3b. The DVD recording/reproducing apparatus 3a and the BD recording/reproducing apparatus 3b are connected to the liquid crystal television 2. The DVD recording/reproducing apparatus 3a and the BD recording/reproducing apparatus 3b each store a plurality of display images and are capable of displaying the stored display images on the display screen portion 23 through the control portion 21, similarly to the HDD 24 and the memory card 30.

The display image 40 shown in FIG. 1 is a recorded image and the like and an example of the plurality of display images. The plurality of display images stored in each of the HDD 24, the memory card 30, the DVD recording/reproducing apparatus 3a and the BD recording/reproducing apparatus 3b are images not responding to movement of the remote controller 1.

The outline of the display image selecting operation of the imaging apparatus 100 according to the first embodiment of the present invention will be now described with reference to FIGS. 7 to 16.

Figure 7:
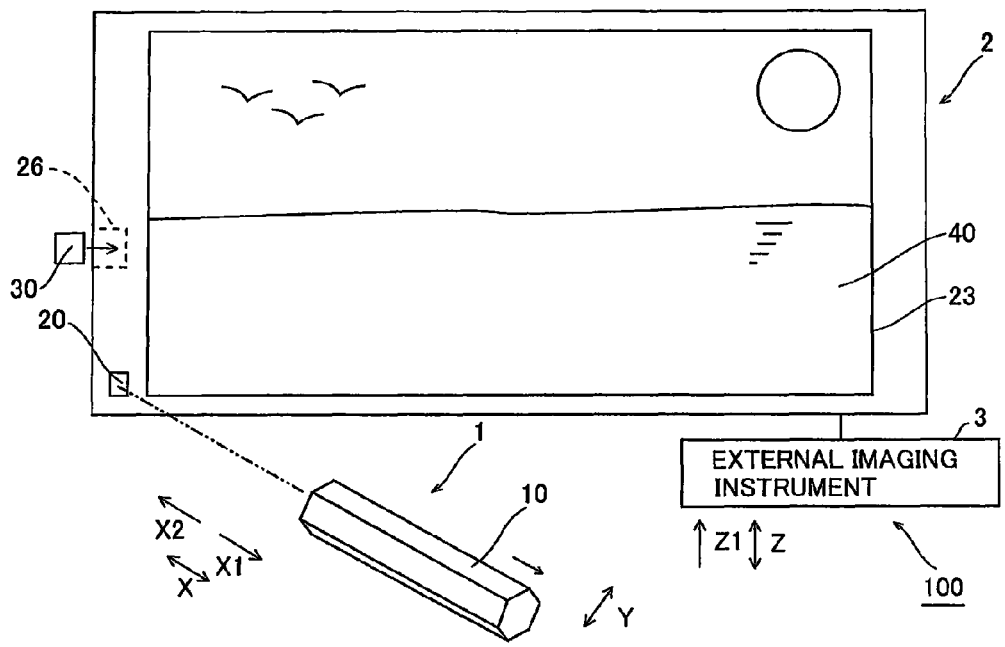

As shown in FIG. 7, the display image 40 is displayed on the display screen portion 23 of the liquid crystal television 2. An operator (not shown) pulls the remote controller 1 along arrow X1, namely, rearward, thereby displaying the menu icon 4a on the display screen portion 23 to overlap with the display image 40 as a first selection screen 4, as shown in FIG.

8. The menu icon 4a is an example of the "first graphical user interface" in the present invention.

According to the first embodiment, the menu icon 4a is sterically displayed as a rotating body having a hexagonal prism shape corresponding the shape of the remote controller 1 on the display screen portion 23. Selection items 4b of the display image are displayed on six side surfaces of the hexagonal prism shaped menu icon 4a. The selection items 4b include the HDD 24, the memory card 30, the DVD recording/reproducing apparatus 3a and the BD recording/reproducing apparatus 3b, for example. The side surface displayed to be located on a front side on the display screen portion 23 among the six side surfaces of the menu icon 4a is displayed in a state different from other side surfaces. Thus, the selection item 4b displayed on the side surface located on the front side shows a present selected state. The hexagonal prism shape is an example of the "polygonal prism shape" in the present invention, and each of the six side surfaces is an example of the "display surface" in the present invention, respectively.

According to the first embodiment, the operator rotates the remote controller 1 along arrow A or B about an axial center of a longitudinal direction (direction X) at an angular speed smaller than constant angular acceleration as shown in FIG. 9, thereby displaying the menu icon 4a to rotate in the same direction (along arrow C or D) as that of the remote controller 1 in synchronization (association) with the movement of the remote controller 1. At this time, the side surface of the menu icon 4a located on the front side is displayed to be switched to other side surface adjacent thereto. More specifically, the operator rotates the remote controller 1 rightward (along arrow A) at the angular speed smaller than the constant angular acceleration, so that the menu icon 4a rotates rightward (along arrow C) at a constant angle. Thus, the side surface of the menu icon 4a located on the front side is displayed to be switched to other side surface on the left side (along arrow D) adjacent thereto. The operator rotates the remote controller 1 leftward (along arrow B) at the angular speed smaller than the constant angular acceleration, so that the menu icon 4a rotates leftward (along arrow D) at the constant angle. Thus, the side surface of the menu icon 4a located on the front side is displayed to be switched to other side surface on the right side (along arrow C) adjacent thereto.

The operator rotates the remote controller 1 along arrow A or B at the constant angular acceleration or more, so that the menu icon 4a is displayed on the display screen portion 23 to continuously rotate along arrow C or D. At this time, the side surface of the menu icon 4a located on the front side is displayed to be continuously switched to other side surface. The operator rotates the remote controller 1 in a direction opposite to a rotational direction of the menu icon 4a in a state where the menu icon 4a is displayed on the display screen portion 23 to continuously rotate along arrow C or D, so that the rotation of the menu icon 4a is displayed to be stopped.

The selection item 4b displayed on the side surface of the menu icon 4a located on the front side is selectable, and the operator rotates the remote controller 1 along arrow A or B at the angular speed smaller than the constant angular acceleration, so that the adjacent side surface is successively located on the front side in place of the side surface located on the front side. Thus, the selection item 4b displayed on the side surface newly located on the front side is successively selectable in place of the selection item 4b displayed on the side surface which was located on the front side.

As shown in FIG. 10, the operator (not shown) pulls the remote controller 1 along arrow X1, namely backward, so that the selection item 4b displayed on the side surface of the menu icon 4a located on the front side is selected and determined. According to the first embodiment, an example of the selection and determination of the selection item 4b corresponding to the HDD 24 will be described. The selection item 4b corresponding to the HDD 24 is selected and determined, thereby ending display of the display image 40 (see FIG. 7) on the display screen portion 23 and switching from the first selection screen 4 to a second selection screen 5 corresponding to the HDD 24 as shown in FIG. 11. As shown in FIG. 10, on the other hand, the operator pushes the remote controller 1 along arrow X2, namely, frontward, thereby canceling display of the first selection screen 4 (menu icon 4a). In other words, the first selection screen 4 is ended to return to a state where only the display image 40 is displayed on the display screen portion 23, as shown in FIG. 7.

As shown in FIG. 11, a plurality of the thumbnail images 5b are displayed on a first display region 5a spreading on a center of the second selection screen 5 on the display screen portion 23. Each of the thumbnail images 5b corresponds to a part of the plurality of display images stored in the HDD corresponding to the selection item 4b selected and determined on the first selection screen 4. The four search icons 5d to 5g for searching the plurality of display images stored in the HDD 24 are displayed on a second display region 5c on an upper portion of the second selection screen 5 on the display screen portion 23. These four search icons 5d to 5g display different search methods for the plurality of display images stored in the HDD 24. More specifically, the search icon 5d (Photo) displays a search method searching a still image (display image) stored in the HDD 24, while the search icon 5e (Date All) displays a search method searching the display images stored in the HDD 24 by a date on which the display image was recorded. The search icon 5f (History All) displays a search method searching the display images stored in the HDD 24 by a display history, while the search icon 5g (Title All) displays a search method searching the display images stored in the HDD 24 by a title of the display image. The thumbnail images 5b and the search icons 5d to 5g are each an example of the "second graphical user interface" in the present invention.

The remote controller 1 is moved along arrow Z1, namely upward, continuously twice in a state where the second selection screen 5 is displayed on the display screen portion 23, thereby displaying the pointer 5h on the substantial center of the second selection screen 5 on the display screen portion 23, as shown in FIG. 12. This pointer 5h vertically and horizontally moves in synchronization with vertical and horizontal directions (directions Y and Z) of the remote controller 1.

As shown in FIG. 13, the operator (not shown) pulls the remote controller 1 along arrow X1, namely backward in a state where the pointer 5h points any of the thumbnail images 5b of the first display region 5a, so that the thumbnail image 5b pointed by the pointer 5h is selected and determined. Thus, the second selection screen 5 is ended on the display screen portion 23, as shown in FIG. 14, and a display image 50 corresponding to the selected and determined thumbnail image 5b is read from the HDD 24 and displayed.

Figure 8:
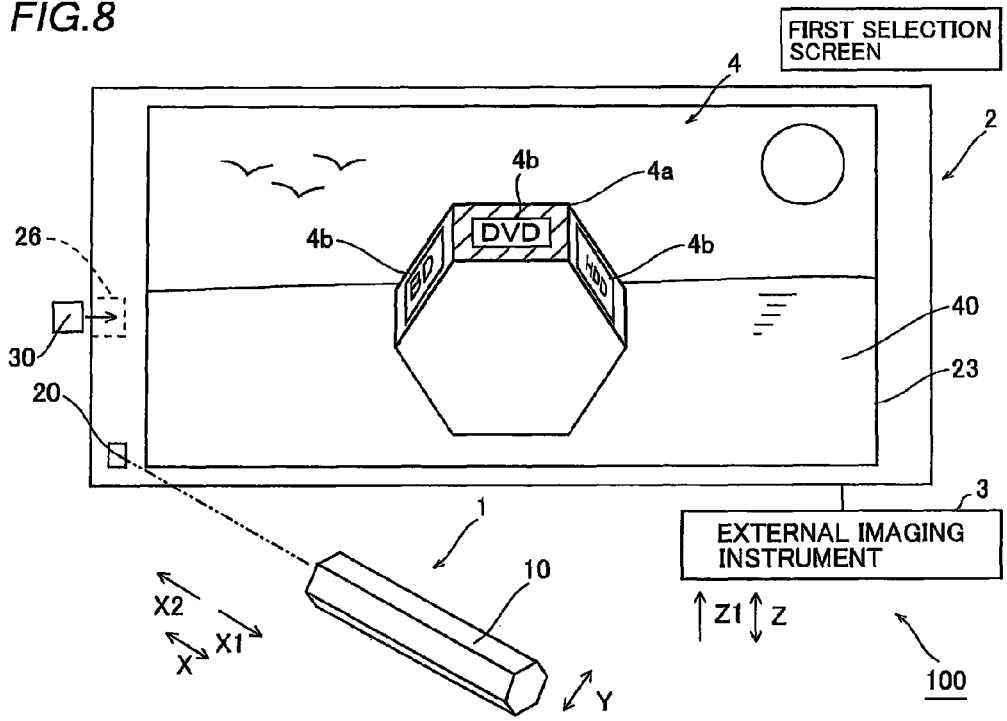

As shown in FIGS. 13 and 15, the operator pushes the remote controller 1 along arrow X2, namely frontward, thereby canceling display of the second selection screen 5 on the second selection screen 5. In other words, the second selection screen 5 is ended to return to the first selection screen 4. Thus, the menu icon 4a is displayed on the display screen portion 23 to overlap with the display image 40 on the display screen portion 23 as the first selection screen 4 again, as shown in FIGS. 8 to 10. As shown in FIG. 15, the operator (not shown) pulls the remote controller 1 along arrow X1, namely backward in a state where any of the search icons of the second display region 5c is pointed by the pointer 5h, so that any of the search icons 5d to 5g pointed by the pointer 5h is selected and determined. According to the first embodiment, an example of the selection and determination of the search icon 5e displaying the search method searching the display images stored in the HDD 24 by the date on which the display screen was recorded will be described. Thus, the second selection screen 5 is switched to a third selection screen 6 on the display screen portion 23, as shown in FIG. 16. Thus, the selected and determined search icon 5e is not displayed, and the menu icon 6a corresponding to the selected and determined search icon 5e is displayed to overlap on the second selection screen 5. In other words, the menu icon 6a for searching the display images stored in the HDD 24 by the date on which the display screen was recorded is displayed.

According to the first embodiment, the menu icon 6a has substantially the same shape as the menu icon 4a and performs substantially the same operation, as shown in FIG. 16. More specifically, the menu icon 6a is displayed on the display screen portion 23 to correspond to the shape of the remote controller 1. In other words, the menu icon 6a is sterically displayed as a rotating body having a hexagonal prism shape on the display screen portion 23. Selection items 6b corresponding to the selected and determined search icon 5e are displayed on respective six side surfaces of the menu icon 6a. For example, in a case of the menu icon 6a for searching the display images stored in the HDD 24 by the date on which the display screen was recorded, the selection items 6b such as "ALL (all dates)", "This Month" and "Last Month" are displayed on the respective six side surfaces of the menu icon 6a. The selection item 6b displayed on the side surface located on the front side shows a present selected state. The menu icon 6a is an example of the "first graphical user interface" or the "third graphical user interface" in the present invention, and each of the selection items 6b is an example of the "detailed selection item" in the present invention.

The operator rotates the remote controller 1 rightward (along arrow A) at an angular speed smaller than constant angular acceleration, thereby displaying the menu icon 6a on the display screen portion 23 to rotate rightward (along arrow E) by a constant angle. Thus, the side surface of the menu icon 6a located on the front side is displayed to be switched to other side surface on the left side (along arrow F) adjacent thereto. The operator rotates the remote controller 1 leftward (along arrow B) at the angular speed smaller than the constant angular acceleration, thereby displaying the menu icon 6a on the display screen portion 23 to rotate leftward (along arrow F) by the constant angle. Thus, the side surface of the menu icon 6a located on the front side is displayed to be switched to the side surface on the right side (along arrow D) adjacent thereto.

The operator rotates the remote controller 1 along arrow A or B at the constant angular acceleration or more, so that the menu icon 6a is displayed on the display screen portion 23 to continuously rotate along arrow E or F. The operator rotates the remote controller 1 in a direction opposite to a rotational direction of the menu icon 6a in a state where the menu icon 6a is displayed on the display screen portion 23 to continuously rotate along arrow E or F, so that rotation of the menu icon 6a is stopped.

The selection item 6b displayed on the side surface of the menu icon 6a located on the front side is selectable, and the operator rotates the remote controller 1 along arrow A or B at the angular speed smaller than the constant angular acceleration, so that the adjacent side surface is successively located on the front side in place of the side surface located on the front side. Thus, the selection item 6b displayed on the side surface newly located on the front side is successively selectable in place of the selection item 6b displayed on the surface which was located on the front side.

The operator (not shown) pulls the remote controller 1 along arrow X1, namely backward, so that the selection item 6b displayed on the side surface of the menu icon 6a located on the front side is selected and determined and search corresponding to the selected and determined selection item 6b is performed. For example, when the "Last month" is selected and determined, search on the display image dated last month is performed. Thus, results obtained by the search are displayed as the thumbnail images 5b in the first display region 5a on the display screen portion 23 as shown in FIG. 11. As shown in FIG. 16, on the other hand, the operator pushes the remote controller 1 along arrow X2, namely, frontward, thereby canceling display of the third selection screen 6 (menu icon 6a) as shown in FIG. 11. In other words, the second selection screen 5 is switched to the third selection screen 6. Thus, the menu icon 6a is not displayed on the display screen portion 23 to return to a state where the second selection screen 5 is displayed.

A control flow of an image selecting operation of the remote controller 1 of the imaging apparatus 100 according to the first embodiment of the present invention will be now described with reference to FIG. 17.

Figure 17:
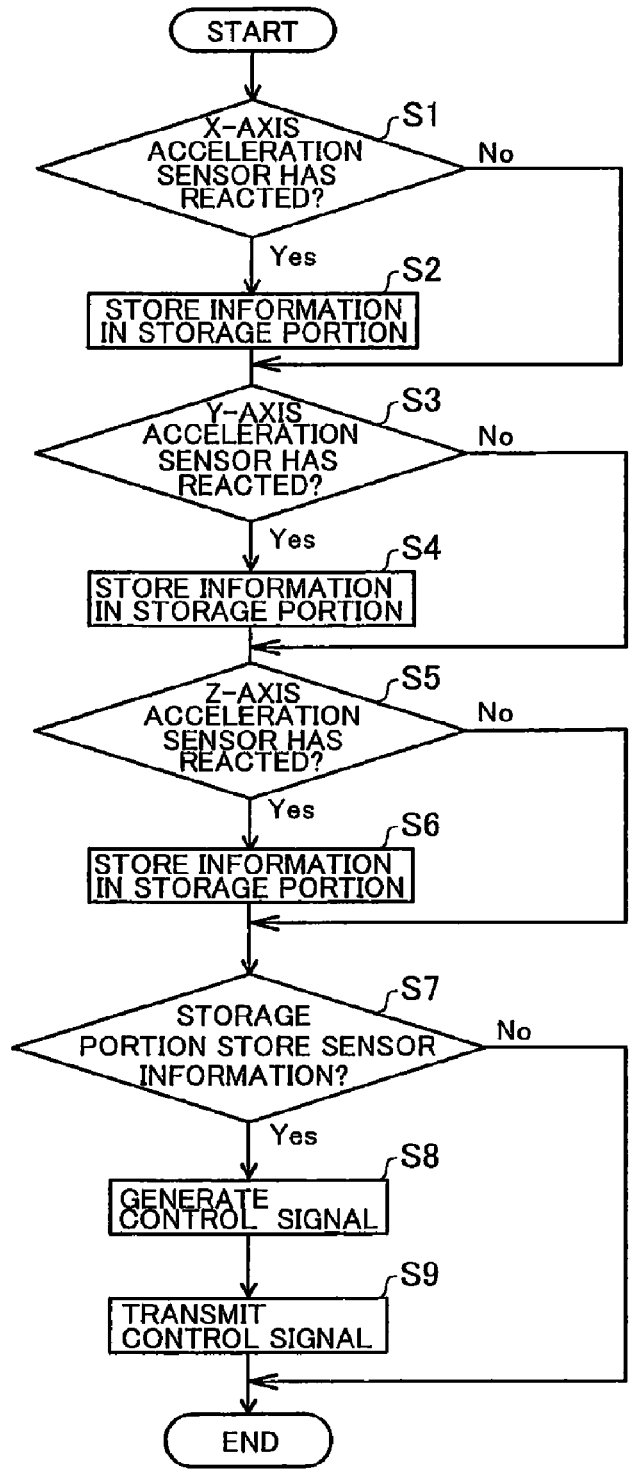
FIG. 17 is a diagram for illustrating a control flow of the remote controller of the imaging apparatus according to the first embodiment of the present invention.

As shown in FIG. 17, at a step S1, it is determined whether or not the X-axis acceleration sensor 11a has reacted. In other words, it is determined whether or not the remote controller 1 has moved in the direction X. If determining that the X-axis acceleration sensor 11a has reacted at the step S1, the process advances to a step S2 and information (acceleration data) of the X-axis acceleration sensor 11a is temporarily stored in the storage portion 13. Then, the process advances to a step S3. If determining that the X-axis acceleration sensor 11a has not reacted at the step S1, the process advances to the step S3.

At the step S3, it is determined whether or not the Y-axis acceleration sensor 11b has reacted. In other words, it is determined whether or not the remote controller 1 has moved in the direction Y. If determining that the Y-axis acceleration sensor 11b has reacted at the step S3, the process advances to a step S4 and information (acceleration data) of the Y-axis acceleration sensor 11b is temporarily stored in the storage portion 13. Then, the process advances to a step S5. If determining that the Y-axis acceleration sensor 11b has not reacted at the step S3, the process advances to the step S5.

At the step S5, it is determined whether or not the Z-axis acceleration sensor 11c has reacted. In other words, it is determined whether or not the remote controller 1 has moved in the direction Z. If determining that the Z-axis acceleration sensor 11c has reacted at the step S5, the process advances to a step S6 and information (acceleration data) of the Z-axis acceleration sensor 11c is temporarily stored in the storage portion 13. Then, the process advances to a step S7. If determining that the Z-axis acceleration sensor 11c has not reacted at the step S5, the process advances to the step S7.

At the step S7, it is determined whether or not the storage portion 13 store the information of the X-axis acceleration sensor 11a, the information of the Y-axis acceleration sensor 11b and the information of the Z-axis acceleration sensor 11c. If determining that the storage portion 13 stores at least one of the information of the X-axis acceleration sensor 11a, the information of the Y-axis acceleration sensor 11b and the information of the Z-axis acceleration sensor 11c at the step S7, the process advances to a step S8, a control signal corresponding to movement detected from acceleration of the remote controller 1 in the directions X, Y and Z is generated in the control signal generating portion 14 and outputs to the infrared transmission portion 15. The process advances to a step S9, and the control signal is transmitted from the infrared transmission portion 15 to the outside. Then, control of the remote controller 1 is ended. If determining the storage portion 13 does not store any of the information of the X-axis acceleration sensor 11a, the information of the Y-axis acceleration sensor 11b and the information of the Z-axis acceleration sensor 11c at the step S7, the control of the remote controller 1 is ended.

A control flow of an image selecting operation of the liquid crystal television 2 of the imaging apparatus 100 according to the first embodiment of the present invention will be now described with reference to FIGS. 7, 14 and 18 to 20.

Figure 18:
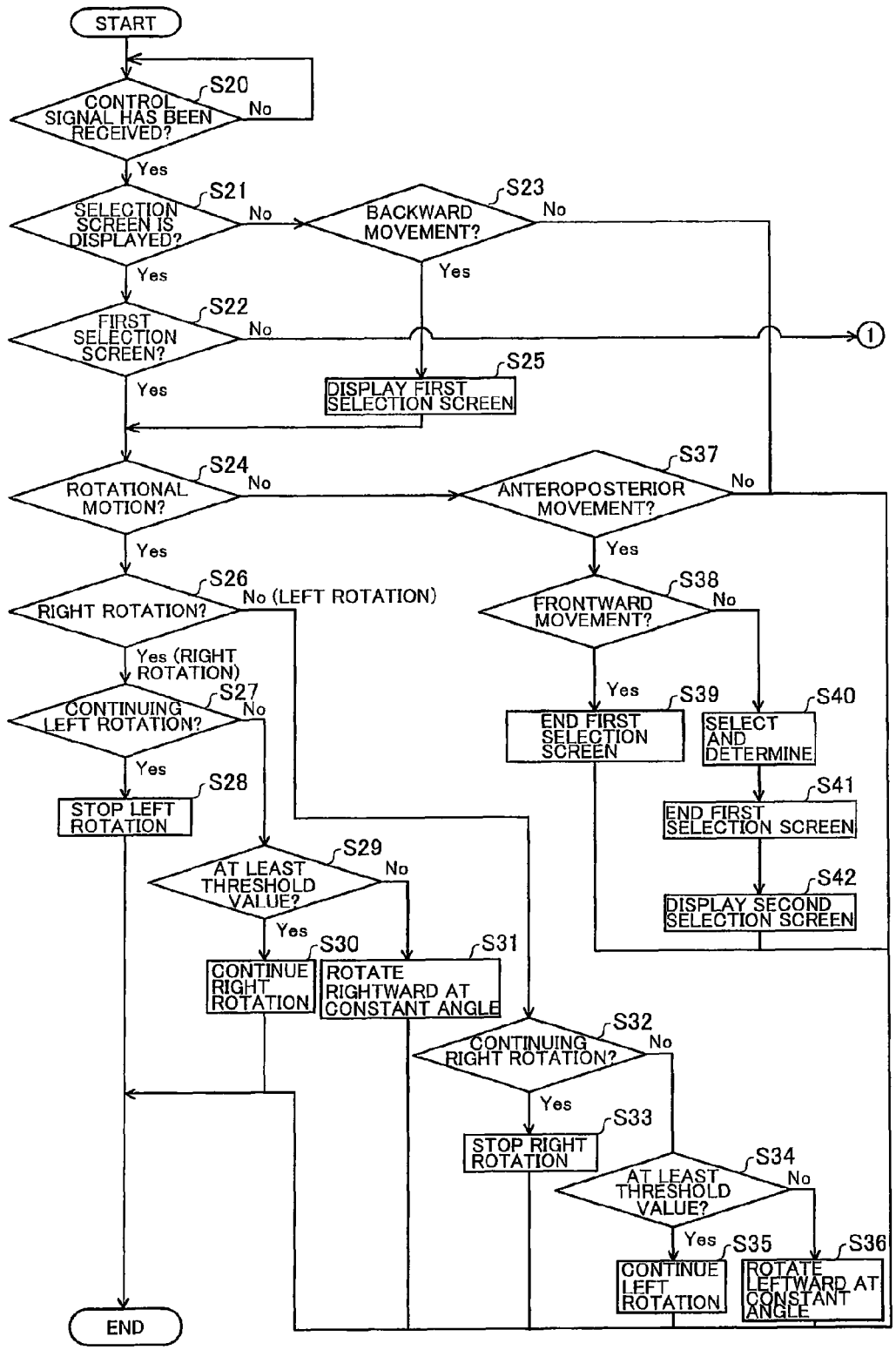
FIGS. 18 to 20 are diagrams for illustrating a control flow of the liquid crystal television of the imaging apparatus according to the first embodiment of the present invention.

As shown in FIG. 18, at a step S20, it is determined whether or not the infrared receiving portion 20 has received the control signal transmitted from the infrared transmission portion 15. If determining that the infrared receiving portion has received the control signal transmitted from the infrared transmission portion 15 at the step S20, the process advances to a step S21. If determining that the infrared receiving portion 20 has not received the control signal transmitted from the infrared transmission portion 15 at the step S20, this process is repeated until determining the infrared receiving portion 20 has received the control signal transmitted from the infrared transmission portion 15.

At the step S21, it is determined whether or not any of the first selection screen 4, the second selection screen 5 and the third selection screen 6 is displayed on the display screen portion 23. If determining any of the first selection screen 4, the second selection screen 5 and the third selection screen 6 is displayed on the display screen portion 23 at the step S21, the process advances to a step S22. If determining that any of the first selection screen 4, the second selection screen 5 and the third selection screen 6 is not displayed on the display screen portion 23 at the step S21, the process advances to a step S23.

As the step S22, it is determined whether or not a selection screen displayed on the display screen portion 23 is the first selection screen 4. If determining that the selection screen displayed on the display screen portion 23 is the first selection screen 4 at the step S22, the process advances to a step S24. If determining that the selection screen displayed on the display screen portion 23 is not the first selection screen 4 at the step S22, the process advances to a step S43 (see FIG. 19).

As the step S23, it is determined whether or not the control signal which the infrared receiving portion 20 has received is associated with movement of pulling the remote controller 1 along arrow X1, namely backward. If determining that the remote controller 1 is pulled backward at the step S23, the process advances to a step S25 and the menu icon 4a is displayed on the display screen portion 23 to overlap with the display image 40 as the first selection screen 4. Thereafter, the process advances to the step S24. If determining that the remote controller 1 is not pulled backward at the step S23, control of the liquid crystal television 2 is ended.

As the step S24, it is determined whether or not the control signal which the infrared receiving portion 20 has received is associated with rotational motion of the remote controller 1 on a YZ plane. If determining that the remote controller 1 has performed the rotational motion at the step S24, the process advances to a step S26. If determining that the remote controller 1 has not performed the rotational motion at the step S24, the process advances to a step S37.

At the step S26, it is determined whether or not the remote controller 1 has rotated rightward (along arrow A). If determining that remote controller 1 has rotated rightward at the step S26, the process advances to a step S27. If determining that remote controller 1 has rotated leftward (along arrow B) at the step S26, the process advances to a step S32.

At the step S27, it is determined whether or not the menu icon 4a continuously rotates leftward on the display screen portion 23. If determining that the menu icon 4a continuously rotates leftward (along arrow D) at the step S27, the process advances to a step S28 and the left rotation of the menu icon 4a is stopped on the display screen portion 23. Then, the control of the liquid crystal television 2 is ended. If determining that the menu icon 4a does not continuously rotate leftward at the step S27, the process advances to a step S29.

At the step S29, it is determined whether or not the remote controller 1 has rotated rightward at the constant angular acceleration or more. If determining that the remote controller 1 has rotated rightward at the constant angular acceleration or more at the step S29, the process advances to a step S30 and the menu icon 4a continuously rotates rightward (along arrow C) on the display screen portion 23. Then, the control of the liquid crystal television 2 is ended. If determining that the remote controller 1 has rotated rightward at the angular acceleration smaller than the constant angular acceleration at the step S29, the process advances to a step S31 and the menu icon 4a rotates rightward at a constant angle (60 degrees). Then, the control of the liquid crystal television 2 is ended.

At the step S32, it is determined whether or not the menu icon 4a continuously rotates rightward on the display screen portion 23. If determining that the menu icon 4a continuously rotates rightward at the step S32, the process advances to a step S33 and the right rotation of the menu icon 4a is stopped on the display screen portion 23. Then, the control of the liquid crystal television 2 is ended. If determining that the menu icon 4a does not continuously rotate rightward at the step S32, the process advances to a step S34.

At the step S34, it is determined whether or not the remote controller 1 has rotated leftward at the constant angular acceleration or more. If determining that the remote controller 1 has rotated leftward at the constant angular acceleration or more at the step S34, the process advances to a step S35 and the menu icon 4a continuously rotates leftward on the display screen portion 23. Then, the control of the liquid crystal television 2 is ended. If determining that the remote controller 1 has rotated leftward at the angular acceleration smaller than the constant angular acceleration at the step S34, the process advances to a step S36 and the menu icon 4a rotates leftward at a constant angle (60 degrees). Then, the control of the liquid crystal television 2 is ended.

At the step S37, it is determined whether or not the control signal which the infrared receiving portion 20 has received is associated with anteroposterior movement of the remote controller 1 on a X-axis. If determining that the remote controller 1 has anteroposteriorly moved at the step S37, the process advances to a step S38. If determining that the remote controller 1 has not anteroposteriorly moved at the step S37, the control of the liquid crystal television 2 is ended.

At the step S38, it is determined whether or not the remote controller 1 is pushed along arrow X2, namely frontward. If determining that the remote controller 1 has been pushed along arrow X2, namely frontward at the step S38, the process advances to a step S39, the first selection screen 4 is selected to be cancelled and the first selection screen 4 ends to be returned to the state where only the display image 40 is displayed on the display screen portion 23. Then, the control of the liquid crystal television 2 is ended. If determining that the remote controller 1 is pulled along arrow X1, namely backward at the step S38, the process advances to a step S40 and the selection item 4b displayed on the side surface of the menu icon 4*a* located on the front side is selected and determined. The process advances to a step S41, the first selection screen 4 ends, and display of the display image 40 (see FIG. 7) is ended. The process advances to a step S42, and the second selection screen 5 is displayed. Then, the control of the liquid crystal television 2 is ended.

Figure 19:
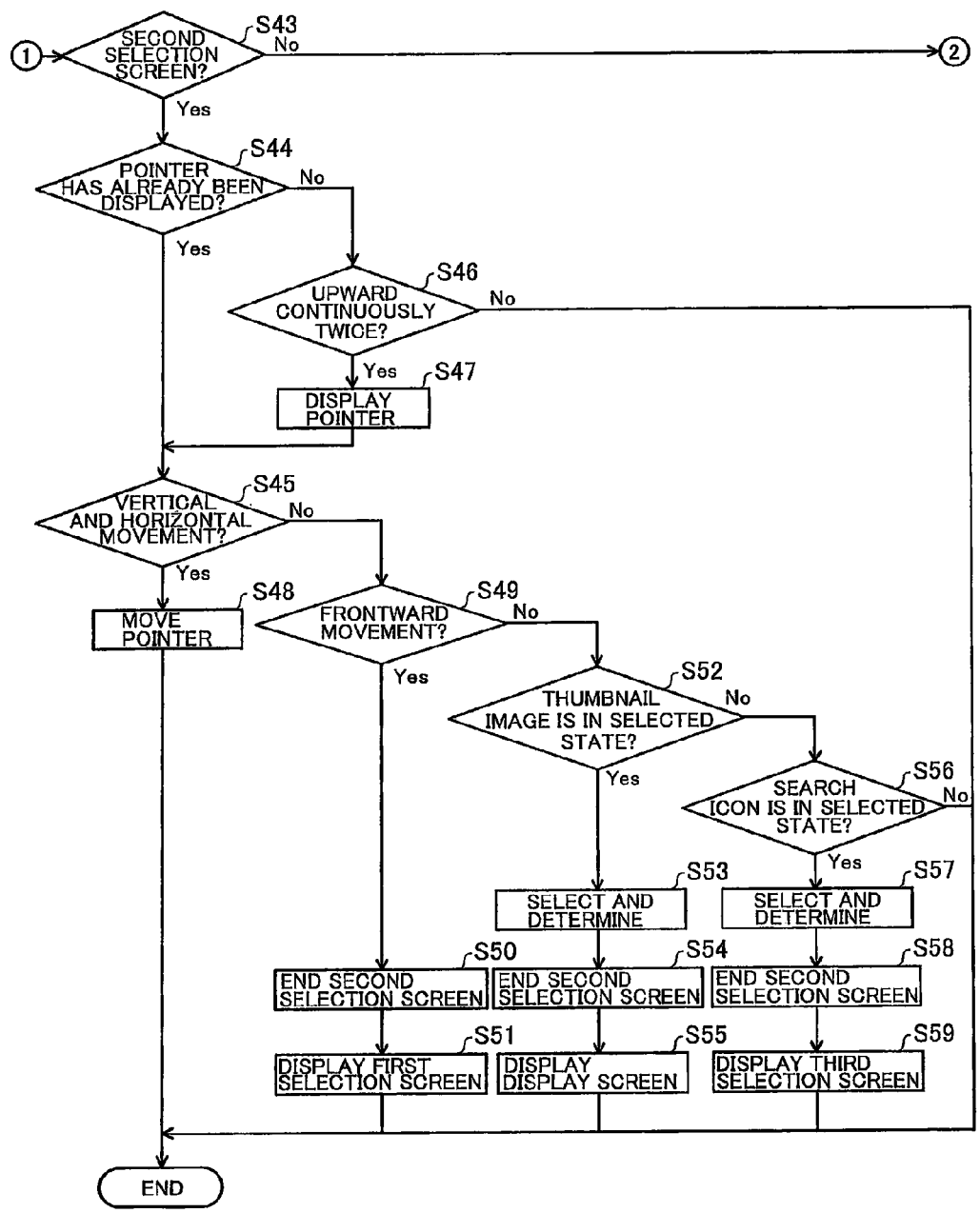

As shown in FIG. 19, it is determined whether or not a selection screen displayed on the display screen portion 23 is the second selection screen 5 at the step S43. If determining that the selection screen displayed on the display screen portion 23 is the second selection screen 5 at the step S43, the process advances to a step S44. If determining that the selection screen displayed on the display screen portion 23 is the third selection screen 6 at the step S43, the process advances to a step S60 (see FIG. 20).

At the step S44, it is determined whether or not the pointer 5*h* is displayed on the display screen portion 23. If determining that the pointer 5*h* is displayed at the step S44, the process advances to a step S45. If determining that the pointer 5*h* is not displayed at the step S44, the process advances to a step S46 and it is determined whether or not the remote controller 1 is moved upward continuously twice at the step S46. If determining that the remote controller 1 is moved upward continuously twice at the step S46, the process advances to a step S47 and the pointer 5*h* is displayed on the display screen portion 23. Then, the process advances to the step S45. If determining that the remote controller 1 is not moved upward continuously twice at the step S46, the control of the liquid crystal television 2 is ended.

At the step S45, it is determined whether or not the control signal which the infrared receiving portion 20 has received is associated with vertical and horizontal motion of the remote controller 1 on Y- and Z-axes. If determining that the remote controller 1 has been moved vertically and horizontally at the step S45, the process advances to a step S48 and the pointer 5*h* is displayed on the display screen portion 23 to move vertically and horizontally in synchronization with the vertical and horizontal movement of the remote controller 1. Then, the control of the liquid crystal television 2 is ended. If determining that the remote controller 1 has been moved anteroposteriorly (in the direction X) at the step S45, the process advances to a step S49.

At the step S49, it is determined whether or not the remote controller 1 has been pushed along arrow X2, namely frontward. If determining that the remote controller 1 has been pushed along arrow X2, namely frontward at the step S49, the second selection screen 5 is selected and cancelled, the process advances to a step S50, the second selection screen 5 ends on the display screen portion 23, and the process advances to a step S51 to be returned to the first selection screen 4. Then, the control of the liquid crystal television 2 is ended. If determining that the remote controller 1 has been pulled along arrow X1, namely backward at the step S49, the process advances to a step S52.

At the step S52, it is determined whether or not any one of the thumbnail images 5*b* is pointed by the pointer 5*h*. In other words, it is determined whether or not the pointer 5*h* selects any of the thumbnail images 5*b*. If determining that the pointer 5*h* selects any of the thumbnail images 5*b* at the step S52, the process advances to a step S53 and the thumbnail image 5*b* selected by the pointer 5*h* is selected and determined. Then, the process advances to a step S54, the second selection screen 5 ends, the process advances to a step S55, and the display image 50 (see FIG. 14) regarding the selected and determined thumbnail image 5*b* is read to be displayed on the display screen portion 23. Then, the control of the liquid crystal television 2 is ended. If determining that the pointer 5*h* does not point any of the thumbnail images 5*b* at the step S52, the process advances to a step S56.

At the step S56, it is determined whether or not any one of the search icons 5*d* to 5*g* is pointed by the pointer 5*h*. In other words, it is determined whether or not the pointer 5*h* selects any of the search icons 5*d* to 5*g*. If determining that the pointer 5*h* selects any of the search icons 5*d* to 5*g* at the step S56, the process advances to a step S57 and any of the search icons 5*d* to 5*g* selected by the pointer 5*h* is selected and determined. Then, the process advances to a step S58, the second selection screen 5 ends, the process advances to a step S59, and the third selection screen 6 is displayed on the display screen portion 23. Then, the control of the liquid crystal television 2 is ended. If determining that the pointer 5*h* does not select any of the search icons 5*d* to 5*g* at the step S56, the control of the liquid crystal television 2 is ended.

Figure 20:
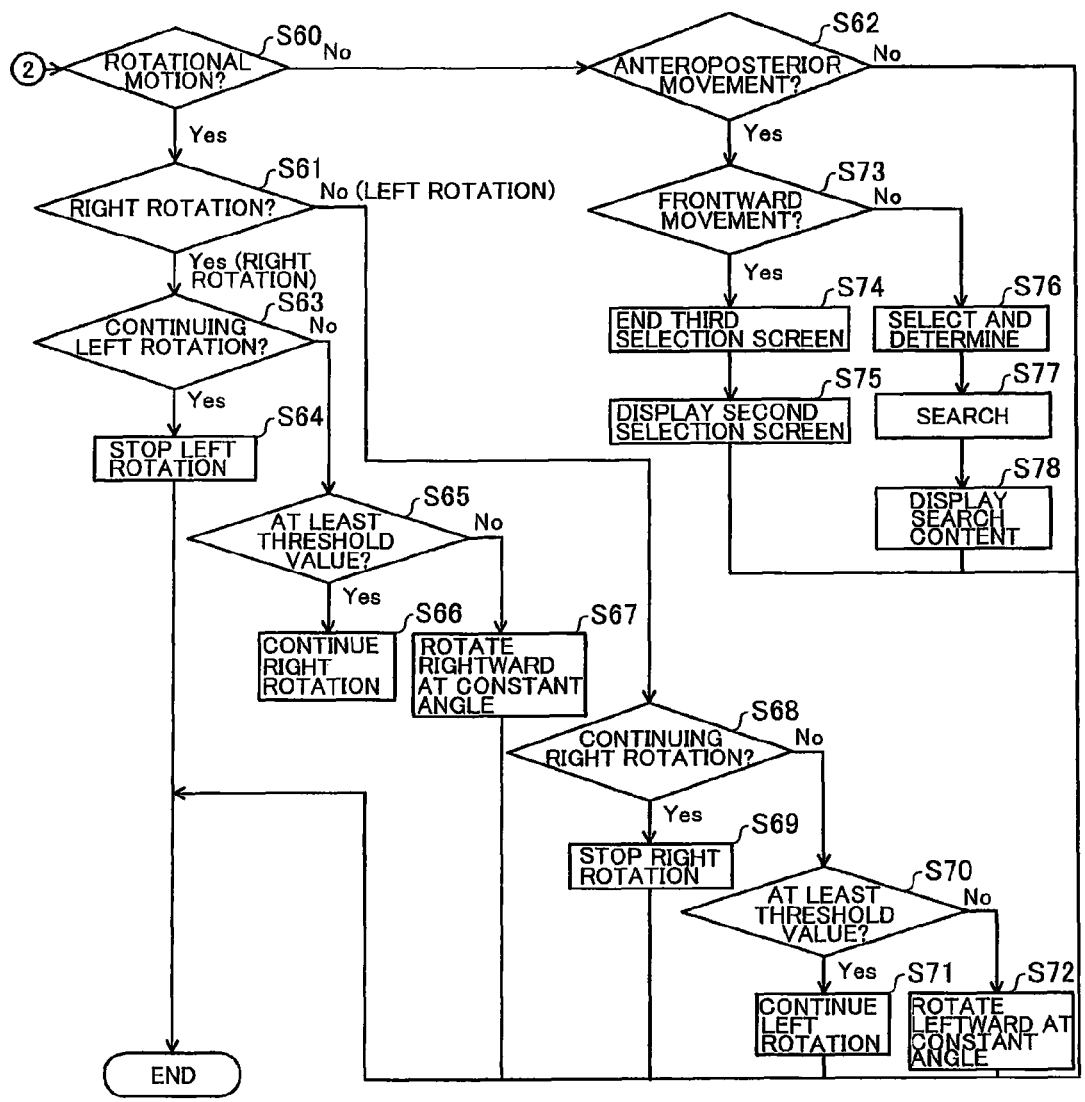

As shown in FIG. 20, it is determined whether or not the control signal which the infrared receiving portion 20 has received is associated with the rotational motion of the remote controller 1 on the YZ plane at the step S60. If determining that the remote controller 1 has performed the rotational motion at the step S60, the process advances to a step S61. If determining that the remote controller 1 has not performed the rotational motion at the step S60, the process advances to a step S62.

At the step S61, it is determined whether or not the remote controller 1 has rotated rightward (along arrow A). If determining that remote controller 1 has rotated rightward at the step S61, the process advances to a step S63. If determining that remote controller 1 has rotated leftward (along arrow B) at the step S61, the process advances to a step S68.

At the step S63, it is determined whether or not the menu icon 6*a* continuously rotates leftward (along arrow F) on the display screen portion 23. If determining that the menu icon 6*a* continuously rotates leftward at the step S63, the process advances to a step S64 and the left rotation of the menu icon 6*a* is stopped on the display screen portion 23. Then, the control of the liquid crystal television 2 is ended. If determining that the menu icon 6*a* does not continuously rotate leftward at the step S63, the process advances to a step S65.

At the step S65, it is determined whether or not the remote controller 1 has rotated rightward (along arrow E) at the constant angular acceleration or more. If determining that the remote controller 1 has rotated rightward at the constant angular acceleration or more at the step S65, the process advances to a step S66 and the menu icon 6*a* continuously rotates rightward on the display screen portion 23. Then, the control of the liquid crystal television 2 is ended. If determining that the remote controller 1 has rotated rightward at the angular acceleration smaller than the constant angular acceleration at the step S65, the process advances to a step S67 and the menu icon 6*a* rotates rightward at a constant angle (60 degrees). Then, the control of the liquid crystal television 2 is ended.

At the step S68, it is determined whether or not the menu icon 6*a* continuously rotates rightward on the display screen portion 23. If determining that the menu icon 6*a* continuously rotates rightward at the step S68, the process advances to a step S69 and the right rotation of the menu icon 6*a* is stopped on the display screen portion 23. Then, the control of the liquid crystal television 2 is ended. If determining that the menu icon 6*a* does not continuously rotate rightward at the step S68, the process advances to a step S70.

At the step S70, it is determined whether or not the remote controller 1 has rotated leftward at the constant angular acceleration or more. If determining that the remote controller 1 has rotated leftward at the constant angular acceleration or more at the step S70, the process advances to a step S71 and the menu icon 6a continuously rotates leftward on the display screen portion 23. Then, the control of the liquid crystal television 2 is ended. If determining that the remote controller 1 has rotated leftward at the angular acceleration smaller than the constant angular acceleration at the step S70, the process advances to a step S72 and the menu icon 6a rotates leftward at a constant angle (60 degrees). Then, the control of the liquid crystal television 2 is ended.

At the step S62, it is determined whether or not the control signal which the infrared receiving portion 20 has received is associated with anteroposterior movement of the remote controller 1 on the X-axis. If determining that the remote controller 1 has anteroposteriorly moved at the step S62, the process advances to a step S73. If determining that the remote controller 1 has not anteroposteriorly moved at the step S62, the control of the liquid crystal television 2 is ended.

At the step S73, it is determined whether or not the remote controller 1 is pushed along arrow X2, namely frontward. If determining that the remote controller 1 has been pushed along arrow X2, namely frontward at the step S73, the third selection screen 6 is selected to be cancelled, the process advances to a step S74, the third selection screen 6 ends, the process advances to a step S75 to be returned to the state where the second selection screen 5 is displayed on the display screen portion 23. Then, the control of the liquid crystal television 2 is ended. If determining that the remote controller 1 is pulled along arrow X1, namely backward at the step S73, the process advances to a step S76 and the selection item 6b displayed on the side surface of the menu icon 6a located on the front side is selected and determined. The process advances to a step S77, search corresponding to the selected and determined selection item 6b is performed. The process advances to a step S78, and results obtained by the search are displayed as the thumbnail images 5b in the first display region 5a on the display screen portion 23. Then, the control of the liquid crystal television 2 is ended.

According to the first embodiment, as hereinabove described, the remote controller 1 including no operating button is employed and the menu icons 4a and 6a on the display screen portion 23 of the liquid crystal television 2 is moved in association with the rotational operation of the remote controller 1, whereby the menu icons 4a and 6a can be moved only by moving the remote controller 1 without pushing down the operating button. Thus, operability of the remote controller 1 can be improved. The selected selection item 4b of the menu icon 4a, the selected selection item 6b of the menu icon 6a, the thumbnail images 5b and any of the search icons 5d to 5g are selected and determined by the backward movement (along arrow X1) of the remote controller 1, whereby the selection item 4b of the menu icon 4a, the selection item 6b of the menu icon 6a, the thumbnail images 5b and the search icons 5d to 5g can be selected and determined with providing no operating button. There are few opportunities to move the selection item 4b of the menu icon 4a, the selection item 6b of the menu icon 6a, the thumbnail images 5b and the search icons 5d to 5g on the substantially flat display screen portion 23 in synchronization (association) with the anteroposterior movement of the remote controller 1, and hence the selection item 4b of the menu icon 4a, the selection item 6b of the menu icon 6a, the thumbnail images 5b and any of the search icons 5d to 5g can be reliably selected and determined as compared with a case of moving the remote controller 1 in other directions.

According to the first embodiment, as hereinabove described, the operator rotates the remote controller 1 along arrow A or B about the axial center of the longitudinal direction (direction X), so that the plurality of the selection items 4b and 6b can be successively selectably displayed while rotating the menu icons 4a and 6a in the same direction (along arrow C or D) as that of the remote controller 1 in synchronization (association) with the movement of the remote controller 1, whereby the selection item 4b of the menu icon 4a and the selection item 6b of the menu icon 6a can be easily selected and determined by the rotational movement and the anteroposterior movement (in the direction X) of the remote controller 1 by the operator.

According to the first embodiment, as hereinabove described, the operator rotates the remote controller 1 along arrow A or B about the axial center of the longitudinal direction (direction X) at the constant angular speed or more, so that the menu icons 4a and 6a are displayed on the display screen portion 23 to continuously rotate in the same direction (along arrow C(E) or D(F)) as that of the remote controller 1, and the operator rotates the remote controller 1 in the direction opposite to the rotational direction of the menu icons 4a and 6a in the state where the menu icons 4a and 6a are displayed to continuously rotate, so that the display screen portion 23 is displayed to stop the rotation of the menu icons 4a and 6a, whereby the operator can keep rotating the menu icons 4a and 6a displayed on the display screen portion 23 without rotating the remote controller 1 many times, and the rotation of the menu icons 4a and 6a can be easily stopped by the rotational movement in the opposite direction, and hence operability of the remote controller 1 can be improved also in this point.

According to the first embodiment, as hereinabove described, the first selection screen 4 and the third selection screen 6 displayed with the menu icons 4a and 6a displayed to have the hexagonal prism shapes corresponding to the hexagonal prism shape of the remote controller 1 are displayed on the display screen portion 23, whereby the operator can viscerally move the menu icons 4a and 6a having the hexagonal prism shapes corresponding to the shape of the remote controller 1 displayed on the display screen portion 23 by moving the remote controller 1 having the hexagonal prism shape and the menu icons 4a and 6a can be sterically displayed, and hence the operator can more viscerally operate it. One of the plurality of the selection items 4b and one of the plurality of the selection items 6b are displayed on each of the six side surfaces of the menu icons 4a and each of the six side surfaces of the menu icons 6a, respectively, whereby the operator can viscerally select and determine ones of the pluralities of the selection items 4b and 6b. The thumbnail images 5b and the search icons 5d to 5g are selected on the second selection screen 5 by the pointer 5h, whereby the operator can reliably select and determine the thumbnail images 5b and the search icons 5d to 5g.

According to the first embodiment, as hereinabove described, the operator rotates the remote controller 1 along arrow A or B at the angular speed smaller than the constant angular acceleration, so that the selection items 4b and 6b displayed on the side surfaces newly located on the front side are successively selectable in place of the selection items 4b and 6b displayed on the side surfaces which were located on the front side, whereby any of the prescribed selection items 4b and 6b are always located on the front side to be brought into selectable states dissimilarly to a case where the menu icons 4a and 6a are rotated at the same angle as the rotational angle of the remote controller 1, and hence the operator can easily select and determine the pluralities of the selection items 4b and 6b.

According to the first embodiment, as hereinabove described, the operator pulls the remote controller 1 along arrow X1, namely backward, so that the selection items 4b and 6b displayed on the side surfaces of the menu icons 4a and 6a located on the front side are selected and determined, and the operator pushes the remote controller 1 along arrow X2, namely frontward, so that display of the menu icons 4a and 6a is canceled, whereby the operator can perform the selection and determination of the selection items 4b and 6b and cancellation of the display of the menu icons 4a and 6a by moving the remote controller 1 frontward (along arrow X2) and backward (along arrow X1).

According to the first embodiment, as hereinabove described, the prescribed selection item 4b of the menu icon 4a is selected and determined on the first selection screen 4 on the basis of the backward movement (along arrow X1) of the remote controller 1, and the prescribed thumbnail image 5b and any of the search icons 5d to 5g selected by the pointer 5h are thereafter selected and determined on the second selection screen 5 on the basis of the backward movement (along arrow X1) of the remote controller 1, whereby the selection item 4b of the menu icon 4a, the thumbnail image 5b and any of the search icons 5d to 5g can be selected and determined on both of the first selection screen 4 and the second selection screen 5 for specifically selecting the selection item 4b selected by the first selection screen 4 by the backward movement (along arrow X1) of the remote controller 1, and hence operability of the remote controller 1 can be further improved.

According to the first embodiment, as hereinabove described, any of the search icons 5d to 5g are selected and determined on the second selection screen 5 on the basis of the backward movement (along arrow X1) of the remote controller 1, and the selection item 6b of the menu icon 6a are thereafter selected and determined on the third selection screen 6 on the basis of the backward movement (along arrow X1) of the remote controller 1, whereby the thumbnail image 5b and any of the search icons 5d to 5g and the selection item 6b of the menu icon 6a can be selected and determined on both of the second selection screen 5 and the third selection screen 6 for specifically selecting the search icons 5d to 5g selected by the second selection screen 5 by the backward movement (along arrow X1) of the remote controller 1, and hence operability of the remote controller 1 can be further improved.

According to the first embodiment, as hereinabove described, the remote controller 1 is moved along arrow Z1, namely upward, continuously twice, so that the pointer 5h is displayed on the substantial center of the second selection screen 5 on the display screen portion 23, whereby no operating button for displaying the pointer 5h may be provided.

According to the first embodiment, as hereinabove described, the operator pulls the remote controller 1 along arrow X1, namely backward, so that the menu icon 4a is displayed on the display screen portion 23 to overlap with the display image 40 on the first selection screen 4, whereby the menu icon 4a can be displayed on the display screen portion 23 with providing no operating button, and hence this also can improve operability of the remote controller 1.

According to the first embodiment, as hereinabove described, the HDD 24 is provided on the liquid crystal television 2, whereby received television broadcasting can be recorded without connecting an external recorder or the like.

Second Embodiment

A second embodiment will be now described with reference to FIGS. 21 to 28. An imaging apparatus 200 according to this second embodiment is provided with a slide portion 216 on a remote controller 201 dissimilarly to the aforementioned first embodiment.

A structure of the imaging apparatus 200 according to the second embodiment of the present invention will be now described with reference to FIGS. 21 to 24.

Figure 21:
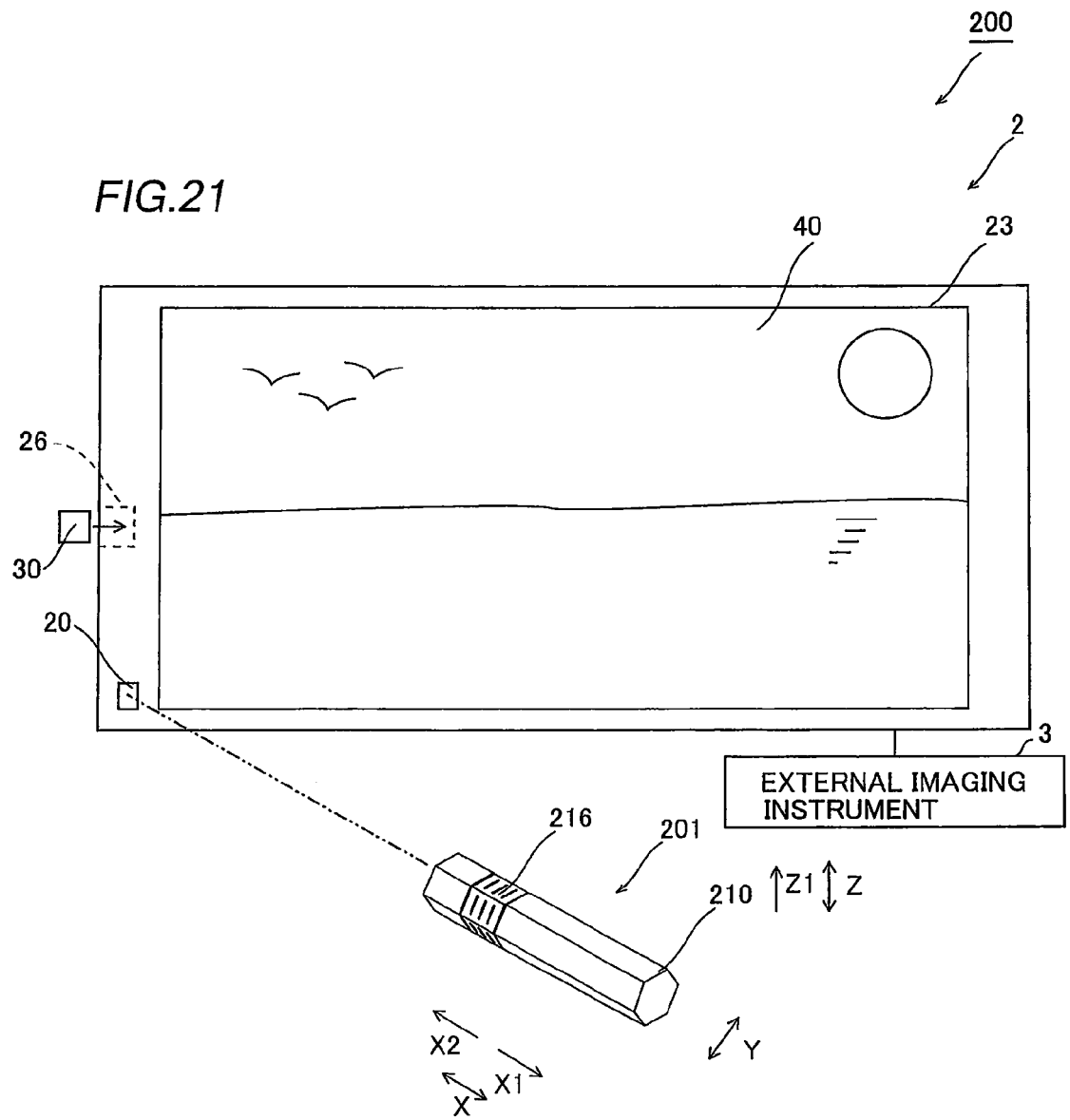
FIG. 21 is a diagram showing an overall structure of an imaging apparatus according to a second embodiment of the present invention.
Figure 22:
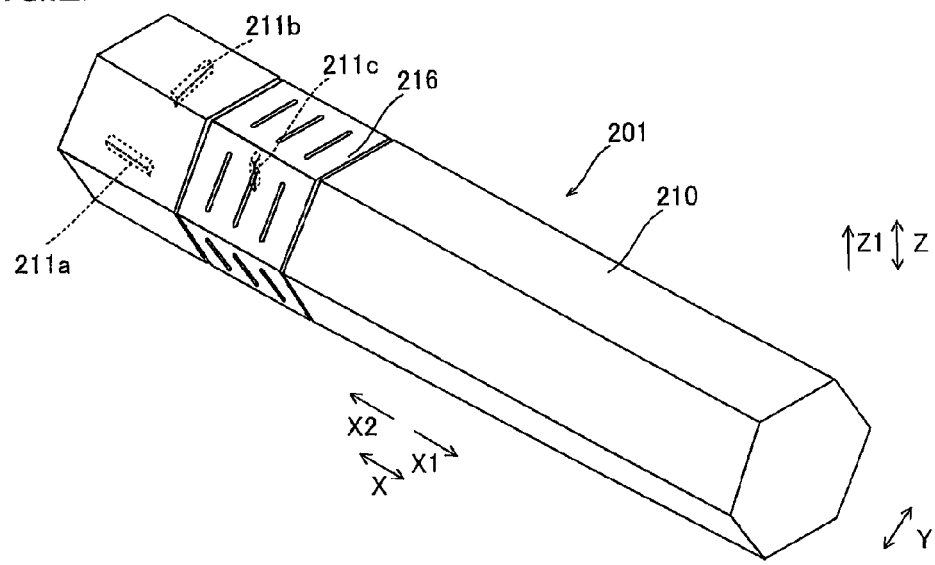
FIG. 22 is a perspective view showing a structure of a remote controller of the imaging apparatus shown in FIG. 21.
Figure 23:
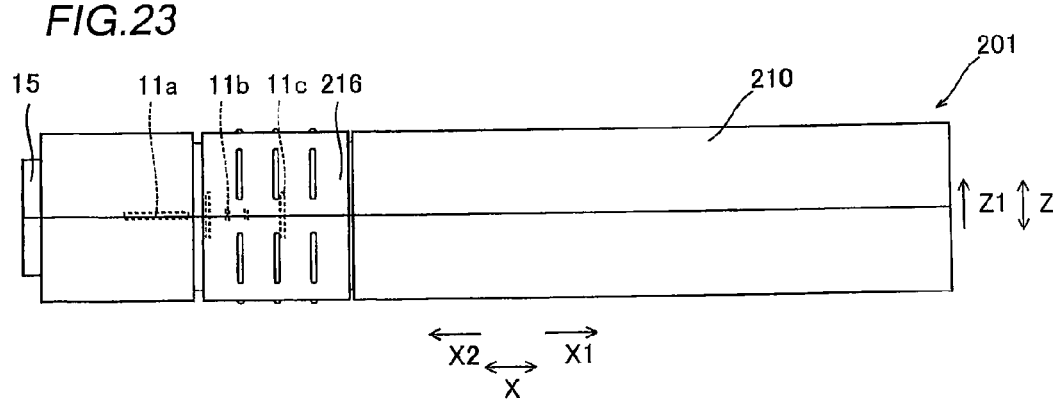
FIG. 23 is a side elevational view showing a structure of the remote controller of the imaging apparatus shown in FIG. 21.
Figure 24:
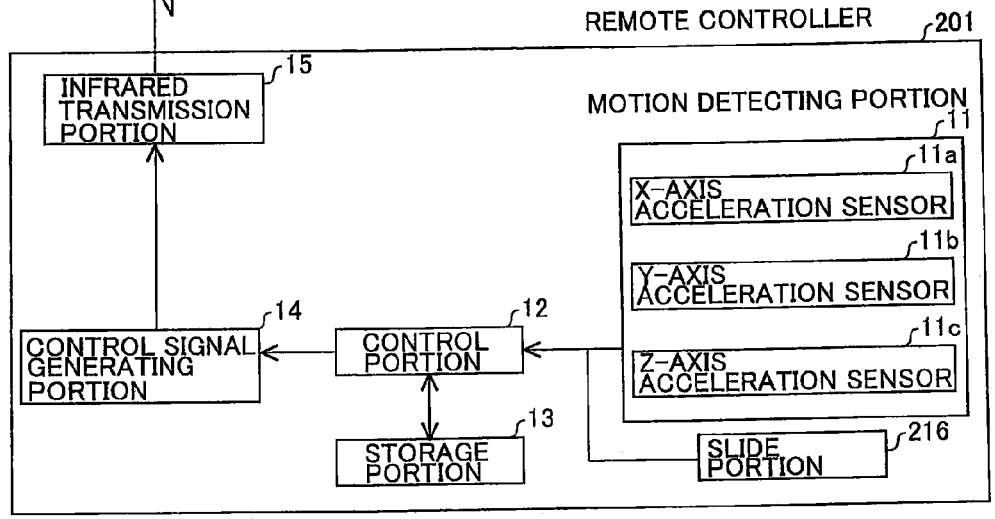
FIG. 24 is a block diagram showing the structure of the remote controller of the imaging apparatus according to the second embodiment of the present invention.

The remote controller 201 of the imaging apparatus 200 according to the second embodiment of the present invention is constituted by a housing 210 having a hexagonal prism shape extending in a direction X, as shown in FIGS. 21 to 23. The remote controller 201 is further provided with the slide portion 216 slidable along arrow X2 on a side of the housing 210 along arrow X2. This slide portion 216 outputs a signal indicating a slide state to a control portion 12 when being slid along arrow X2, as shown in FIG. 24. No operating button is provided on the remote controller 201. The remaining structure of the second embodiment is similar to that of the first embodiment.

The outline of the display image selecting operation of the imaging apparatus 200 according to the second embodiment of the present invention will be now described with reference to FIGS. 25 and 26.

Figure 25:
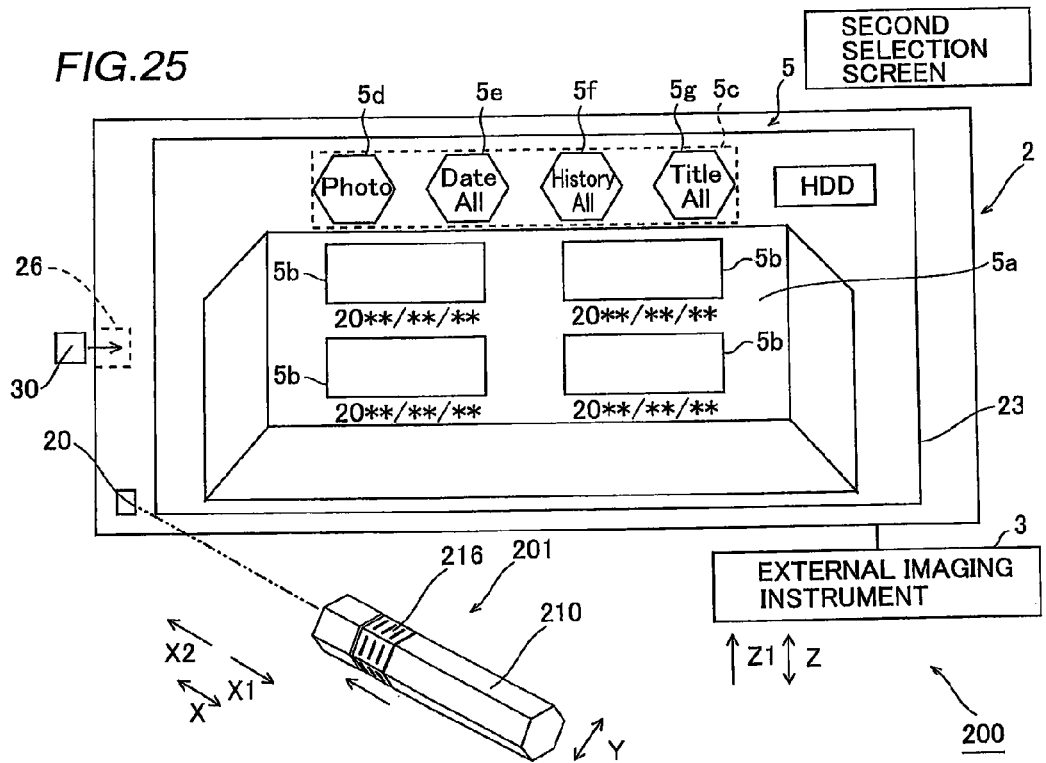

In the display image selecting operation of the imaging apparatus 200 according to the second embodiment, the slide portion 216 of the remote controller 201 is slid along arrow X2, namely frontward on a second selection screen 5 as shown in FIG. 25, thereby displaying a pointer 5h on a substantial center of the second selection screen 5 on a display screen portion 23 as shown in FIG. 26. This pointer 5h is displayed to move vertically and horizontally in synchronization (association) with vertical and horizontal (directions Y and Z) of the remote controller 1, and the pointer 5h displayed on the second selection screen 5 disappears by ending slide of the slide portion 216 along arrow X2. The remaining display image selecting operation of the second embodiment is similar to that of the first embodiment.

A control flow of an image selecting operation of the remote controller 201 of the imaging apparatus 200 according to the second embodiment of the present invention will be now described with reference to FIG. 27.

In the remote controller 201 of the imaging apparatus 200 according to the second embodiment, as shown in FIG. 27, if determining that a storage portion 13 stores at least one of information of a X-axis acceleration sensor 11a, information of a Y-axis acceleration sensor 11b and information of a Z-axis acceleration sensor 11c at the step S7, the process advances to a step S8, a control signal corresponding to movement detected from acceleration of the remote controller 201 in the directions X, Y and Z is generated in a control signal generating portion 14 and outputs to a infrared transmission portion 15. Then, the process advances to a step S210. If determining that the storage portion 13 does not store any of the information of the X-axis acceleration sensor 11a, the information of the Y-axis acceleration sensor 11b and the information of the Z-axis acceleration sensor 11c at the step S7, the process advances to a step S210.

As the step S210, it is determined whether or not the slide portion 216 of the remote controller 201 is slid along arrow X2. If determining that the slid portion 216 is slid at the step S210, the process advances to a step S211, and the slide signal indicating the slide state is generated in the control signal generating portion 14 and is output to the infrared transmission portion 15. Then, the process advances to a step S212. If determining that the slide portion 216 is not slid at the step S210, the process advances to the step S212.

At the step S212, it is determined whether or not the control signal and the slide signal are generated in the control signal generating portion 14 of the remote controller 201. If determining that at least one of the control signal and the slide signal is generated at the step S212, the process advances to a step S209, and the generated control signal and slide signal are transmit from the infrared transmission portion 15 to the outside. Then, control of the remote controller 201 is ended. If determining that the control signal and the slide signal are not generated at the step S212, the control of the remote controller 201 is ended. The remaining control of the remote controller 201 of the second embodiment is similar to that of the first embodiment.

A control flow of an image selecting operation of a liquid crystal television 2 of the imaging apparatus 200 according to the second embodiment of the present invention will be now described with reference to FIG. 28.

In the liquid crystal television 2 of the imaging apparatus 200 according to the second embodiment, as shown in FIG. 28, it is determined whether or not a selection screen displayed on the display screen portion 23 is the second selection screen 5 at a step S43. If determining that the selection screen displayed on the display screen portion 23 is the second selection screen 5 at the step S43, the process advances to a step S290.

At the step S290, it is determined whether or not the infrared receiving portion 20 has received the slide signal. If determining that the infrared receiving portion 20 has received the slide signal at the step S290, the process advances to a step S247, and the pointer 5h is displayed on the display screen portion 23. Then, the process advances to the step S45. If determining that the infrared receiving portion 20 has not received the slide signal at the step S290, control of the liquid crystal television 2 is ended. The remaining control of the liquid crystal television 2 of the second embodiment is similar to that of the first embodiment.

According to the second embodiment, as hereinabove described, the slide portion 216 for displaying the pointer 5h on the display screen portion 23 is provided on the remote controller 201, whereby the pointer 5h can be displayed on the display screen portion 23 by sliding the slide portion 216, and hence no operating button for displaying the pointer 5h may be provided. The remaining effects of the second embodiment is similar to that of the first embodiment.

Although the present invention has been described and illustrated in detail, it is clearly understood that the same is by way of illustration and example only and is not to be taken by way of limitation, the spirit and scope of the present invention being limited only by the terms of the appended claims.

For example, while each of the aforementioned first and second embodiments is applied to the imaging apparatus including the liquid crystal television 2, the present invention is not restricted to this but can alternatively be applied to other imaging apparatus, so far as the imaging apparatus comprises a remote controller and an imaging instrument (display) such as a personal computer, for example.

While the selection and cancellation are made by pushing the remote controller along arrow X2, namely frontward and selection and determination are made by pulling the remote controller along arrow X1, namely backward in each of the aforementioned first and second embodiments, the present invention is not restricted to this but selection and determination may be made by pushing the remote controller along arrow X2, namely frontward and the selection and cancellation may be made by pulling the remote controller along arrow X1, namely backward.

While the menu icons 4a and 6a are displayed on the display screen portion 23 to have the same shapes (hexagonal prism shapes) as that of the remote controller in each of the aforementioned first and second embodiments, the present invention is not restricted to this but the menu icons may be displayed on the display screen portion to have shapes different from the remote controller.

While each of the menu icons 4a and 6a is sterically displayed as the rotating body having the hexagonal prism shape corresponding to the shape of the remote controller on the display screen portion 23 in each of the aforementioned first and second embodiments, the present invention is not restricted to this. The menu icons and the remote controller are not restricted to the hexagonal prism shapes in the present invention but may have polygonal prism shapes such as quadrangular prism shapes or hexagonal prism shapes, or circular cylindrical shapes other than the polygonal prism shapes, for example. Further, the menu icons and the remote controller may have spherical shapes which do not have pillar shapes. The menu icons may not be sterically displayed as the rotating bodies on the display screen portion and may be two-dimensionally displayed on the display screen portion, and the menu icons may be operated simultaneously with operation, other than the anteroposterior operation, of the remote controller to switch the selection items.

While the first display region 5a is arranged to spread at the center on the second selection screen 5 and the second display region 5c is arranged on the upper portion of the second selection screen 5 in each of the aforementioned first and second embodiments, the present invention is not restricted to this. Arrangement of the first and second display regions is not particularly restricted in the present invention.

While the display image is displayed by the thumbnail images 5b on the second selection screen 5 in each of the aforementioned first and second embodiments, the present invention is not restricted to this. For example, the display image may be displayed by a text or the like.

While the motion detecting portion 11 is constituted by the X-axis acceleration sensor 11a, the Y-axis acceleration sensor 11b and the Z-axis acceleration sensor 11c in each of the aforementioned first and second embodiments, the present invention is not restricted to this but the motion detecting portion may be constituted by a sensor other than the acceleration sensor. For example, three axial movement may be detected by combining a gyro sensor, a geomagnetic sensor and the like. Alternatively, a motion detecting portion detecting two axial movement may be employed.

While the selection and determination are made by pulling the remote controller along arrow X1, namely backward in the state where the pointer 5h is displayed only on the second selection screen 5 in each of the aforementioned first and second embodiments, the present invention is not restricted to this but the selection and determination may be made by anteroposterior movement of the remote controller in the state where the pointer is displayed also on the first selection screen or the third selection screen.

While the infrared transmission portion 15 and the infrared receiving portion 20 transmit and receive by infrared communication in each of the aforementioned first and second embodiments, the present invention is not restricted to this. A transmitting and receiving method of the transmission portion and the receiving portion is not restricted to infrared rays in the present invention, but the transmission portion and the receiving portion may transmit and receive by radio communication employing radio waves other than the infrared communication, for example.

While the operator pulls the remote controller along arrow X1, namely backward, so that the menu icon 4a is displayed on the display screen portion 23 on the first selection screen 4 in each of the aforementioned first and second embodiments, the present invention is not restricted to this but the menu icon may be displayed on the display screen portion by other movement.

While the menu icon 4a is displayed on the display screen portion 23 to overlap with the display image 40 as the first selection screen 4 in each of the aforementioned first and second embodiments, the present invention is not restricted to this but only the menu icon may be displayed without displaying the display image as the first selection screen.

While the remote controller 1 is moved upward continuously twice for displaying the pointer 5h in the aforementioned first embodiment, the present invention is not restricted to this but the pointer may be displayed by other movement of the remote controller. For example, the pointer may be displayed by downward movement at a constant acceleration.

While the selection items 4b and selection items 6b are displayed on the six side surfaces of the hexagonal prism shaped menu icon 4a and the six side surfaces the hexagonal prism shaped menu icon 6a, respectively, in each of the aforementioned first and second embodiments, the present invention is not restricted to this but the selection items may be displayed only on the three side surfaces among the six side surfaces without displaying the selection items on all of the six side surfaces of each menu icon, for example.

While the selection items 4b and 6b displayed on the side surfaces located on the front side are in the selectable state in each of the aforementioned first and second embodiments, the present invention is not restricted to this but the selection items displayed on the side surfaces located on a side other than the front side may be in the selectable state.

What is claimed is:

1. An imaging apparatus comprising:
   a remote controller including a motion detecting portion detecting movement of a remote controller body and an actuating signal transmission portion transmitting an actuating signal corresponding to said movement on the basis of a result of detection of said motion detecting portion and not including an operating button; and
   an imaging instrument including an actuating signal receiving portion receiving said actuating signal transmitted from said actuating signal transmission portion and a display screen portion capable of displaying a first graphical user interface successively selectably displaying a plurality of selection items in association of movement, other than anteroposterior movement, of said remote controller on the basis of said actuating signal, and
   said imaging instrument further includes a control portion controlling said actuating signal receiving portion and said display screen portion, wherein
   said selection item of said first graphical user interface is selected and determined on the basis of said actuating signal corresponding to the anteroposterior movement of said remote controller, and
   said control portion controls so as to successively selectably display said plurality of selection items while said first graphical user interface rotates in the same direction as a rotational direction of said remote controller in association with rotational motion of said remote controller, and controls so as to select and determine any of said plurality of selection items on the basis of the anteroposterior movement of said remote controller, and
   said control portion is formed so as to display said first graphical user interface on said display screen portion to continuously rotate said first graphical user interface when said remote controller performs rotational motion at a constant angular speed or more, and so as to display said first graphical user interface on said display screen portion to stop rotation of said first graphical user interface when said remote controller is rotated in a direction opposite to a rotational direction of said first graphical user interface in a state where said first graphical user interface is displayed to continuously rotate.

2. The imaging apparatus according to claim 1, wherein said control portion is formed so as to display said first graphical user interface constituted by a rotating body having a plurality of display surfaces on said display screen portion, so as to display one of said plurality of selection items on each of said plurality of display surfaces, and so as to be capable of selecting the selection item displayed on the display surface located on a front side among said plurality of display surfaces.

3. The imaging apparatus according to claim 1, wherein said control portion is formed so as to display said first graphical user interface having a shape corresponding to a shape of said remote controller on said display screen portion.

4. The imaging apparatus according to claim 3, wherein said remote controller has a polygonal prism shape, and said control portion is formed so as to display said first graphical user interface having the polygonal prism shape corresponding to the shape of said remote controller on said display screen portion, and so as to display one of said plurality of selection items on each of said plurality of display surfaces of the polygonal prism shape of said first graphical user interface.

5. The imaging apparatus according to claim 1, wherein said control portion is formed so as to display said first graphical user interface on said display screen portion on the basis of the anteroposterior movement of said remote controller in a state where said first graphical user interface is not displayed on said display screen portion.

6. The imaging apparatus according to claim 1 wherein said display screen portion is enabled to display a first selection screen on which said first graphical user interface is displayed and a second selection screen selectably displaying a plurality of second graphical user interfaces corresponding to said selection item, selected and determined on said first selection screen, of said first graphical user interface, and
said control portion is formed so as to select and determine a prescribed second graphical user interface selected by a pointer on the basis of the anteroposterior movement of said remote controller on said second selection screen after selecting and determining a prescribed selection item of said first graphical user interface on the basis of the anteroposterior movement of said remote controller on said first selection screen.

7. The imaging apparatus according to claim 6, wherein said display screen portion is enabled to display said second selection screen selectably displaying said plurality of second graphical user interfaces and a third selection screen including a third graphical user interface corresponding to selected and determined said second graphical user interface and successively selectably displaying a plurality of detailed selection items in association with the movement, other than the anteroposterior movement, of said remote controller, and
said control portion is formed so as to select and determine detailed selection item of said third graphical user interface on the basis of the anteroposterior movement of said remote controller on said third selection screen after selecting and determining said second graphical user interface by said pointer on the basis of the anteroposterior movement of said remote controller on said second selection screen.

8. The imaging apparatus according to claim 1, wherein said control portion is formed so as to display a pointer on said display screen portion on the basis of continuous movement of said remote controller in either one of upward and downward directions a plurality of times.

9. The imaging apparatus according to claim 1, wherein said remote controller further includes a slide portion for displaying a pointer on said display screen portion by sliding.

10. The imaging apparatus according to claim 1, wherein said imaging instrument is a television receiving television broadcasting and including a storage portion capable of recording received said television broadcasting.

11. A method of controlling an imaging apparatus, comprising steps of:
displaying a first graphical user interface successively selectably displaying a plurality of selection items in association with movement, other than anteroposterior movement, of a remote controller including no operating button on a display screen portion of an imaging instrument; and
selecting and determining selection item of said first graphical user interface displayed on said display screen portion on the basis of the anteroposterior movement of said remote controller, wherein,
said step of displaying said first graphical user interface on said display screen portion includes a step of successively selectably displaying said plurality of selection items of said first graphical user interface while rotating said first graphical user interface in the same direction as a rotational direction of said remote controller in association with rotational motion of said remote controller, and
said step of selecting and determining the selection item of said first graphical user interface includes a step of selecting and determining any of said plurality of selection items on the basis of the anteroposterior movement of said remote controller, and
said step of successively selectably displaying said plurality of selection items includes steps of:
displaying said first graphical user interface on said display screen portion to continuously rotate said first graphical user interface when said remote controller performs rotational motion at a constant angular speed or more, and
displaying said first graphical user interface on said display screen portion to stop rotation of said first graphical user interface when said remote controller rotates in a direction opposite to a rotational direction of said first graphical user interface.

12. The method of controlling an imaging apparatus according to claim 11, wherein
said step of displaying said first graphical user interface on said display screen portion includes steps of:
displaying said first graphical user interface constituted by a rotating body having a plurality of display surfaces, each of which having one of said plurality of selection items displayed thereon, on said display screen portion, and
allowing selection of the selection item displayed on the display surface located on a front side among said plurality of display surfaces.

13. The method of controlling an imaging apparatus according to claim 11, wherein said step of displaying said first graphical user interface on said display screen portion includes a step of displaying said first graphical user interface having a shape corresponding to a shape of said remote controller on said display screen portion.

14. The method of controlling an imaging apparatus according to claim 11, further comprising steps of:
displaying a plurality of second graphical user interfaces corresponding to selected and determined said selection item of said first graphical user interface after said step of selecting and determining the selection item of said first graphical user interface; and
selecting and determining a prescribed second graphical user interface selected by a pointer on the basis of the anteroposterior movement of said remote controller.

15. An imaging apparatus comprising:
a remote controller including a motion detecting portion detecting movement of a remote controller body and an actuating signal transmission portion transmitting an actuating signal corresponding to said movement on the basis of a result of detection of said motion detecting portion and not including an operating button; and
an imaging instrument including an actuating signal receiving portion receiving said actuating signal transmitted from said actuating signal transmission portion and a display screen portion capable of displaying a first graphical user interface successively selectably displaying a plurality of selection items in association of movement, other than anteroposterior movement, of said remote controller on the basis of said actuating signal, and
said imaging instrument further includes a control portion controlling said actuating signal receiving portion and said display screen portion, wherein
said selection item of said first graphical user interface is selected and determined on the basis of said actuating signal corresponding to the anteroposterior movement of said remote controller, and
said control portion controls so as to successively selectably display said plurality of selection items while said first graphical user interface rotates in the same direction as a rotational direction of said remote controller in association with rotational motion of said remote controller, and controls so as to select and determine any of said plurality of selection items on the basis of the anteroposterior movement of said remote controller, and
said control portion is formed so as to display said first graphical user interface constituted by a rotating body having a plurality of display surfaces on said display screen portion, so as to display one of said plurality of selection items on each of said plurality of display surfaces, and so as to be capable of selecting the selection item displayed on the display surface located on a front side among said plurality of display surfaces, and
said control portion is so formed that the selection item adjacent to the selection item which was located on said front side is located on said front side and can be selected in the place of said selection item which was located on said front side when said remote controller performs rotational motion at an angular speed smaller than a constant angular speed.

16. An imaging apparatus comprising:
a remote controller including a motion detecting portion detecting movement of a remote controller body and an actuating signal transmission portion transmitting an actuating signal corresponding to said movement on the basis of a result of detection of said motion detecting portion and not including an operating button; and an imaging instrument including an actuating signal receiving portion receiving said actuating signal transmitted from said actuating signal transmission portion and a display screen portion capable of displaying a first graphical user interface successively selectably displaying a plurality of selection items in association of movement, other than anteroposterior movement, of said remote controller on the basis of said actuating signal, and said imaging instrument further includes a control portion controlling said actuating signal receiving portion and said display screen portion, wherein said selection item of said first graphical user interface is selected and determined on the basis of said actuating signal corresponding to the anteroposterior movement of said remote controller, and said control portion controls so as to successively selectably display said plurality of selection items while said first graphical user interface rotates in the same direction as a rotational direction of said remote controller in association with rotational motion of said remote controller, and controls so as to select and determine any of said plurality of selection items on the basis of the anteroposterior movement of said remote controller, and said control portion is formed so as to select and determine the selection item of said first graphical user interface on the basis of a first directional movement of the anteroposterior direction of said remote controller, and so as to cancel display of said first graphical user interface on the basis of a second directional movement of the anteroposterior direction of said remote controller.

* * * * *